United States Patent
Park et al.

(10) Patent No.: US 12,335,795 B2
(45) Date of Patent: Jun. 17, 2025

(54) ELECTRONIC DEVICE FOR SELECTING CELL, AND METHOD THEREFOR

(71) Applicant: Samsung Electronics Co., Ltd., Suwon-si (KR)

(72) Inventors: Suyoung Park, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 514 days.

(21) Appl. No.: 17/710,211

(22) Filed: Mar. 31, 2022

(65) Prior Publication Data

US 2022/0225195 A1 Jul. 14, 2022

Related U.S. Application Data

(63) Continuation of application No. PCT/KR2020/013081, filed on Sep. 25, 2020.

(30) Foreign Application Priority Data

Oct. 16, 2019 (KR) .................. 10-2019-0128585

(51) Int. Cl.
*H04W 36/00* (2009.01)
*H04W 24/08* (2009.01)
*H04W 74/0833* (2024.01)

(52) U.S. Cl.
CPC ....... *H04W 36/0058* (2018.08); *H04W 24/08* (2013.01); *H04W 36/0061* (2013.01); *H04W 74/0833* (2013.01)

(58) Field of Classification Search
USPC ....... 370/252, 328, 329, 330, 331, 332, 343, 370/431, 436, 437, 466
See application file for complete search history.

(56) References Cited

U.S. PATENT DOCUMENTS 8,886,184 B2   11/2014 Cho et al.
9,832,654 B2   11/2017 Koskinen et al.
(Continued)

FOREIGN PATENT DOCUMENTS

EP   3 787 348 A1   3/2021
EP   3 866 511 A1   8/2021
(Continued)

OTHER PUBLICATIONS

European Office Action Apr. 3, 2024, issued in European Application No. 20 876 098.3-1216.
(Continued)

*Primary Examiner* — Nguyen H Ngo
(74) *Attorney, Agent, or Firm* — Jefferson IP Law, LLP

(57) ABSTRACT

An electronic device is provided. The electronic device includes an antenna, a communication module connected to the antenna, and a processor connected to the communication module, wherein the processor can confirm a frequency band supportable by the electronic device, receive, from a base station, system information including information about a peripheral cell, determine whether the peripheral cell is either an unlicensed cell or a non-terrestrial cell on the basis of the confirmed frequency band and/or the received system information, determine the priority of a frequency, which is the reference for cell selection, on the basis of at least one from among the confirmed frequency band, the received system information, and the type of determined cell, and select a cell according to the determined priority of the frequency.

8 Claims, 20 Drawing Sheets

(56) References Cited

U.S. PATENT DOCUMENTS

| | | | |
|---|---|---|---|
| 9,900,815 B2 | 2/2018 | Jung et al. | |
| 10,440,643 B2 | 10/2019 | Feng | |
| 2015/0139187 A1 | 5/2015 | Arunachalam et al. | |
| 2016/0330654 A1 | 11/2016 | Jung | |
| 2018/0270723 A1 | 9/2018 | Kim et al. | |
| 2019/0200391 A1* | 6/2019 | Li | H04W 74/0833 |
| 2020/0053620 A1* | 2/2020 | Kim | H04W 48/20 |
| 2020/0187073 A1 | 6/2020 | Ma et al. | |
| 2020/0221372 A1* | 7/2020 | Shih | H04W 76/25 |
| 2020/0404620 A1* | 12/2020 | Sang | H04W 24/10 |
| 2020/0413451 A1 | 12/2020 | Taherzadeh Boroujeni et al. | |
| 2021/0068013 A1 | 3/2021 | Cheng | |
| 2021/0084583 A1* | 3/2021 | Niu | H04W 48/20 |
| 2021/0212110 A1* | 7/2021 | Zhang | H04W 74/004 |
| 2021/0266809 A1 | 8/2021 | Chen et al. | |

FOREIGN PATENT DOCUMENTS

| | | |
|---|---|---|
| KR | 10-2015-0079655 A | 7/2015 |
| KR | 10-2018-0070550 A | 6/2018 |
| WO | 2018/093939 A1 | 5/2018 |
| WO | 2019/029416 A1 | 2/2019 |
| WO | 2019/090763 A1 | 5/2019 |
| WO | 2019/161044 A1 | 8/2019 |

OTHER PUBLICATIONS

Charter Communications: "System Information Transmission Enhancements in NR-U", 3GPP Draft; R2-1913653, Mobile Competence Centre ; 650, Route Des Lucioles ; F-06921 Sophia-Antipolis Cedex; France, vol. RAN WG2, No. Chongqing, China; Oct. 4, 2019, XP051805121.

Extended European Search Report dated Sep. 21, 2022, issued in European Patent Application No. 20876098.3.

Samsung, 'Random Access Response Reception in NR-U', R2-1908794, 3GPP TSG-RAN2 107, Aug. 15, 2019.

Korean Office Action dated Nov. 28, 2024, issued in Korean Application No. 10-2019-0128585.

* cited by examiner

ELECTRONIC DEVICE FOR SELECTING CELL, AND METHOD THEREFOR

CROSS-REFERENCE TO RELATED APPLICATION(S)

This application is a continuation application, claiming priority under § 365(c), of an International application No. PCT/KR2020/013081, filed on Sep. 25, 2020, which is based on and claims the benefit of a Korean patent application number 10-2019-0128585, filed on Oct. 16, 2019, in the Korean Intellectual Property Office, the disclosure of which is incorporated by reference herein in its entirety.

BACKGROUND

1. Field

The disclosure relates to a method for selecting a cell by an electronic device in a network environment in which multiple cells exist.

2. Description of Related Art

To meet the demand for wireless data traffic having increased since deployment of $4^{th}$ Generation (4G) communication systems, efforts have been made to develop an improved $5^{th}$ Generation (5G) or pre-5G communication system. Therefore, the 5G or pre-5G communication system is also called a "Beyond 4G Network" communication system or a "Post LTE" system. The 5G communication system is considered to be implemented in ultrahigh frequency (mmWave) bands (e.g., 60 GHz (70 GHz) bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The above information is presented as background information only to assist with an understanding of the disclosure. No determination has been made, and no assertion is made, as to whether any of the above might be applicable as prior art with regard to the disclosure.

SUMMARY

An electronic device may efficiently select or reselect a cell in a network environment in which multiple cells exist.

Aspects of the disclosure are to address at least the above-mentioned problems and/or disadvantages and to provide at least the advantages described below. Accordingly, an aspect of the disclosure is to provide a method for selecting a cell by an electronic device in a network environment in which multiple cells exist.

Additional aspects will be set forth in part in the description which follows and, in part, will be apparent from the description, or may be learned by practice of the presented embodiments.

In accordance with an aspect of the disclosure, an electronic device is provided. The electronic device includes an antenna, a communication module connected to the antenna, and a processor connected to the communication module, wherein the processor is configured to identify a frequency band that the electronic device is able to support, receive system information including information on a neighbor cell from a base station, determine, based on at least one of the identified frequency band and the received system information, whether the neighbor cell is one of an unlicensed cell or a non-terrestrial cell, determine a priority of a frequency as a cell selection criterion, based on at least one of the identified frequency band and the received system information or a type of the determined cell, and select a cell according to the determined priority of the frequency.

In accordance with another aspect of the disclosure, a method for selecting a cell by an electronic device is provided. The method includes identifying a frequency band that the electronic device is able to support, receiving system information including information on a neighbor cell from a base station, determining, based on at least one of the identified frequency band and the received system information, whether the neighbor cell is one of an unlicensed cell or a non-terrestrial cell, determining a priority of a frequency as a cell selection criterion, based on at least one of the identified frequency band and the received system information or a type of the determined cell, and selecting a cell according to the determined priority of the frequency.

In accordance with another aspect of the disclosure, a base station device is provided. The base station device includes an antenna, a communication module connected to the antenna, and a processor connected to the communication module, wherein the processor is configured to transmit information on a cell supported by the base station device, and information on a neighbor cell, and perform a random access operation with an electronic device, wherein the information on the cell includes information on a frequency band that the cell is able to support, and wherein the information on the frequency band that the cell is able to support includes at least one of an unlicensed frequency band and a non-terrestrial frequency band.

In accordance with another aspect of the disclosure, an operation method of a base station device is provided. The operation method includes transmitting information on a cell supported by the base station device, and information on a neighbor cell, and performing a random access with an electronic device, wherein the information on the cell includes information on a frequency band that the cell is able to support, and wherein the information on the frequency band that the cell is able to support includes at least one of an unlicensed frequency band and a non-terrestrial frequency band.

According to the disclosure, an electronic device can efficiently select or reselect a cell in a network environment in which there are multiple cells, the frequency bands of which are different from each other.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
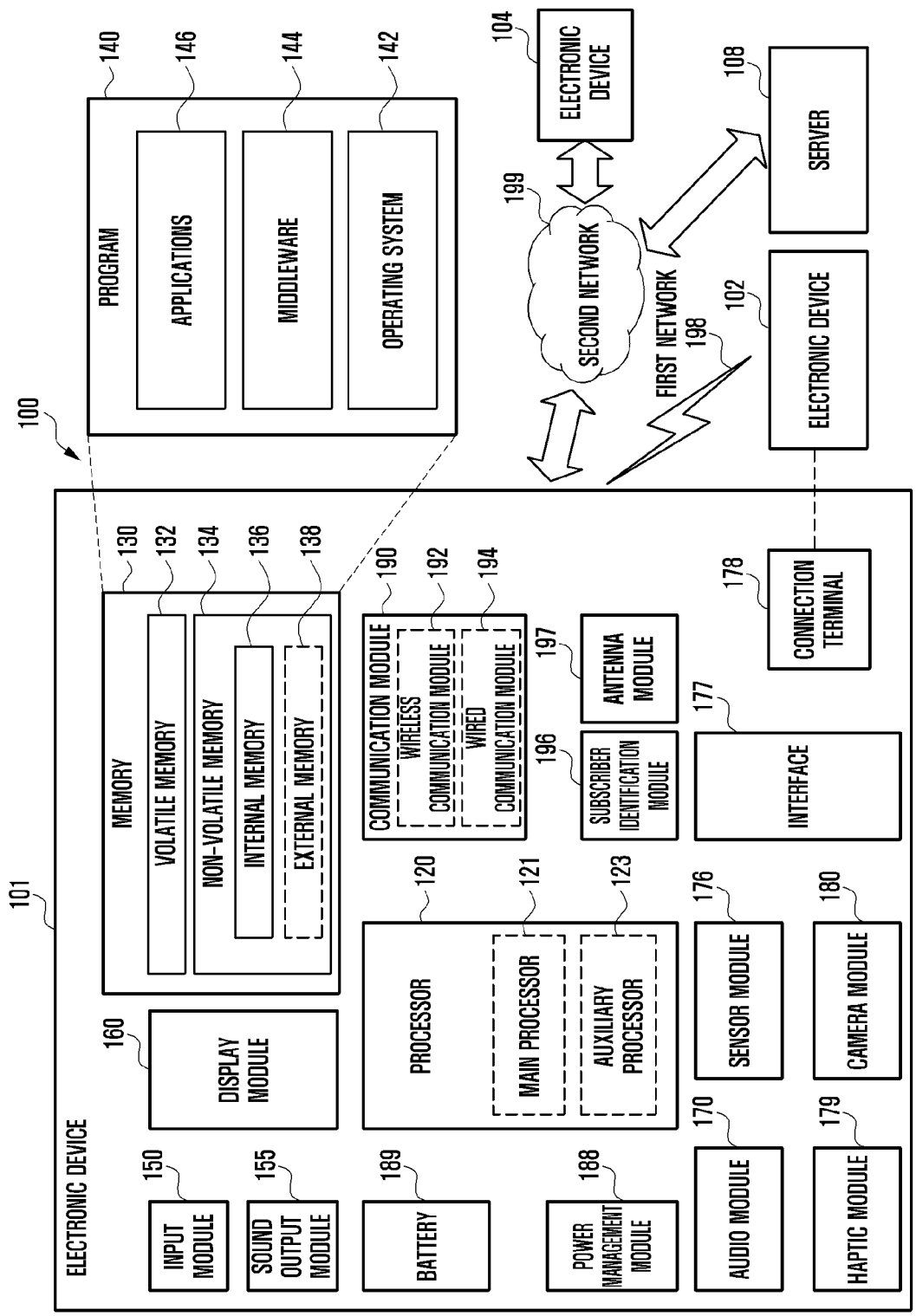
FIG. 1 is a block diagram of an electronic device according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the external electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
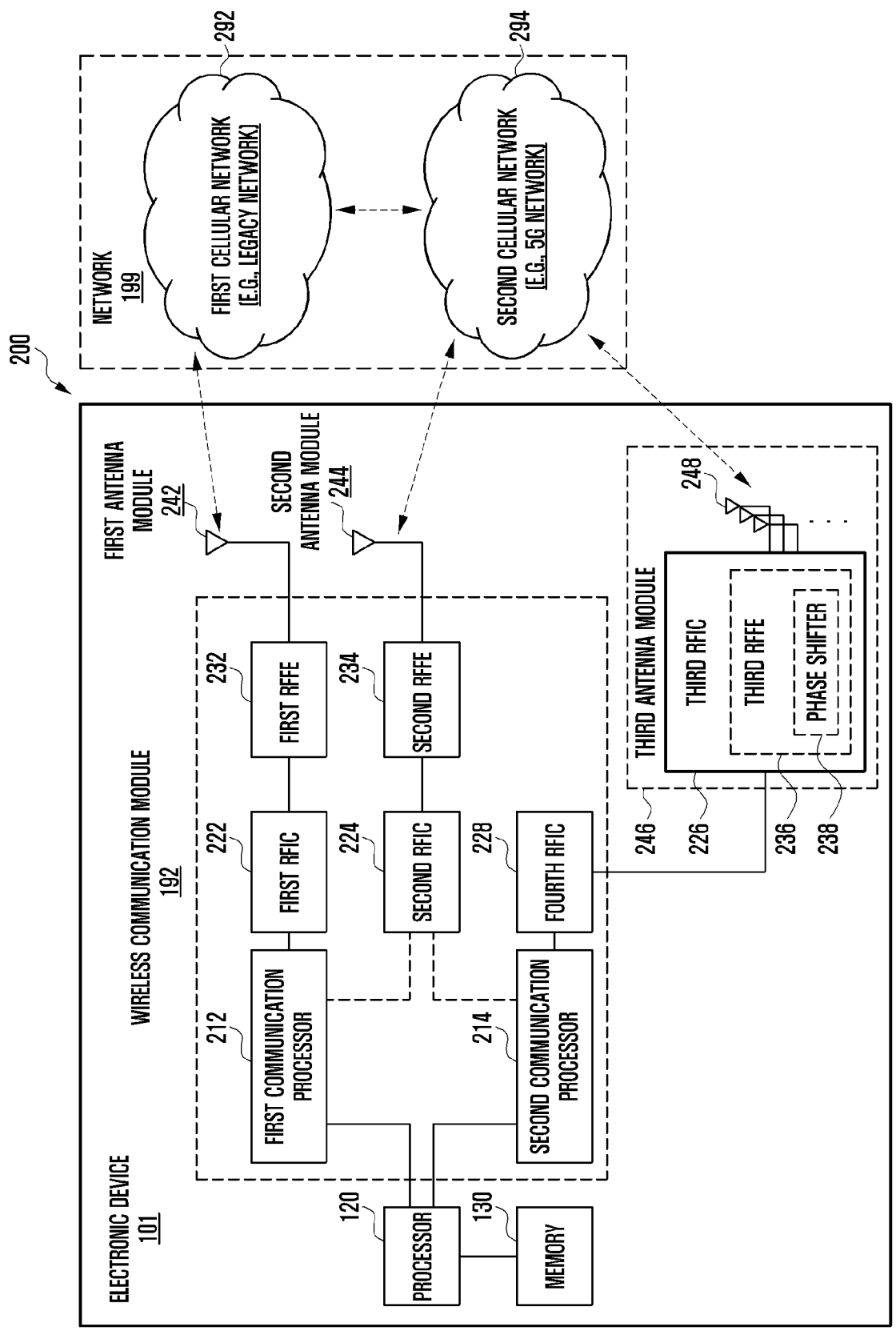
FIG. 2 is a block diagram of an electronic device for supporting legacy network communication and $5^{th}$ Generation (5G) network communication according to an embodiment of the disclosure.

FIG. 2 is a block diagram of an electronic device for supporting legacy network communication and 5G network communication according to an embodiment of the disclosure.

Referring to FIG. 2, an electronic device 101 of block diagram 200 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first network 292 and a second network 294. According to another embodiment, the electronic device 101 may further include at least one component among the components illustrated in FIG. 1, and the second network 199 may further include at least another network. According to an embodiment, the first communication processor 212, the second communication processor 214, the first RFIC 222, the second RFIC 224, the fourth RFIC 228, the first RFFE 232, and the second RFFE 234 may configure at least a part of the wireless communication module 192. According to another embodiment, the fourth RFIC 228 may be omitted, or may be included as a part of the third RFIC 226.

The first communication processor 212 may establish a communication channel within a band to be used for wireless communication with the first network 292 and may support legacy network communication performed through the established communication channel. According to various embodiments, the first network may be a legacy network including a second generation (2G), 3G, 4G, or long-term evolution (LTE) network. The second communication processor 214 may establish a communication channel corresponding to a designated band (e.g., about 6 GHz-60 GHz) among bands to be used for wireless communication with the second network 294, and may support 5G network communication performed through the established communication channel. According to various embodiments, the second network 294 may be a 5G network defined in 3GPP. Additionally, according to an embodiment, the first communication processor 212 or the second communication processor 214 may establish a communication channel corresponding to another designated band (e.g., about 6 GHz or lower) among bands to be used for wireless communication with the second network 294, and may support 5G network communication performed through the established communication channel. According to an embodiment, the first communication processor 212 and the second communication processor 214 may be implemented in a single chip or a single package. According to various embodiments, the first communication processor 212 or the second communication processor 214 may be configured in a single chip or a single package together with the processor 120, the auxiliary processor 123, or the communication module 190.

The first RFIC 222 may convert, at the time of transmission, a baseband signal generated by the first communication processor 212 into a radio frequency (RF) signal having a frequency of about 700 MHz to about 3 GHz, which is used in the first network 292 (e.g., a legacy network). At the time of reception, an RF signal may be obtained from the first network 292 (e.g., a legacy network) through an antenna (e.g., the first antenna module 242), and may be preprocessed through an RFFE (e.g., the first RFFE 232). The first RFIC 222 may convert a preprocessed RF signal into a baseband signal so as to allow the preprocessed RF signal to be processed by the first communication processor 212.

The second RFIC 224 may convert, at the time of transmission, a baseband signal generated by the first communication processor 212 or the second communication processor 214 into a RF signal (hereinafter, a 5G Sub6 RF signal) within a Sub6 band (e.g., about 6 GHz or lower) used in the second network 294 (e.g., a 5G network). At the time of reception, a 5G Sub6 RF signal may be obtained from the second network 294 (e.g., a 5G network) through an antenna (e.g., the second antenna module 244), and may be preprocessed via an RFFE (e.g., the second RFFE 234). The second RFIC 224 may convert a preprocessed 5G Sub6 RF signal into a baseband signal so as to allow the preprocessed 5G Sub6 RF signal to be processed by a corresponding communication processor among the first communication processor 212 or the second communication processor 214.

The third RFIC 226 may convert a baseband signal generated by the second communication processor 214 into a RF signal (hereinafter, a 5G Above6 RF signal) within a 5G Above6 band (e.g., about 6 GHz-about 60 GHz) to be used in the second network 294 (e.g., a 5G network). At the time of reception, a 5G Above6 RF signal may be obtained from the second network 294 (e.g., a 5G network) through an antenna (e.g., the antenna 248), and may be preprocessed via a third RFFE 236. The third RFIC 226 may convert a preprocessed 5G Above6 RF signal into a baseband signal so as to allow the preprocessed 5G Above6 RF signal to be processed by the second communication processor 214. According to an embodiment, the third RFFE 236 may be configured as a part of the third RFIC 226.

According to an embodiment, the electronic device 101 may include the fourth RFIC 228 separately from or at least a part of the third RFIC 226. In this case, the fourth RFIC 228 may convert a baseband signal generated by the second communication processor 214 into an RF signal (hereinafter, an IF signal) within an intermediate frequency band (e.g., about 9 GHz-11 GHz), and then transfer the IF signal to the third RFIC 226. The third RFIC 226 may convert an IF signal into a 5G Above6 RF signal. At the time of reception, a 5G Above6 RF signal may be received from the second network 294 (e.g., a 5G network) through an antenna (e.g., the antenna 248), and may be converted into an IF signal by the third RFFE 236. The fourth RFIC 228 may convert an IF signal into a baseband signal so as to allow the IF signal to be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one antenna module among the first antenna module 242 or the second antenna module 244 may be omitted or combined with another antenna module so as to process RF signals within multiple corresponding bands.

According to an embodiment, the third RFIC 226 and the antenna 248 may be arranged on the same substrate so as to configure a third antenna module 246. For example, the wireless communication module 192 or the processor 120 may be disposed on a first substrate (e.g., a main PCB). In this case, the third RFIC 226 may be disposed in a partial area (e.g., a lower surface) of a second substrate (e.g., a sub PCB) separate from the first substrate, and the antenna 248 may be disposed in another partial area (e.g., an upper surface), so as to configure the third antenna module 246. The length of a transmission line between the third RFIC 226 and the antenna 248 can be reduced by arranging the third RFIC and the antenna on the same substrate. Therefore, for example, loss (e.g., attenuation) of, by a transmission line, a signal within a high frequency band (e.g., about 6 GHz-about 60 GHz) used for 5G network communication can be reduced. Accordingly, the electronic device 101 can improve the quality or speed of communication with the second network 294 (e.g., a 5G network).

According to an embodiment, the antenna 248 may be configured to be an antenna array including multiple antenna elements which are usable for beamforming. In this case, the third RFIC 226 may include, for example, as a part of the third RFFE 236, multiple phase shifters 238 corresponding to the multiple antenna elements. At the time of transmission, each of the multiple phase shifters 238 may convert the phase of a 5G Above6 RF signal to be transmitted to an outside (e.g., a base station of a 5G network) of the electronic device 101 through a corresponding antenna element. At the time of reception, each of the multiple phase shifters 238 may convert, into an identical or a substantially identical phase, the phase of a 5G Above6 RF signal which has been received from the outside through a corresponding antenna element. This process allows transmission or reception through beamforming between the electronic device 101 and the outside.

The second network 294 (e.g., a 5G network) may be operated independently to the first network 292 (e.g., a legacy network) (e.g., stand-alone (SA), or may be operated while being connected thereto (e.g., non-standalone (NSA)). For example, there may be only an access network (e.g., a 5G radio access network (RAN) or a next generation RAN (NG RAN)) in a 5G network without a core network (e.g., a next generation core (NGC)). In this case, the electronic device 101 may access an access network of a 5G network, and then access an external network (e.g., Internet) under the control of a core network (e.g., an evolved packed core (EPC)) of a legacy network. Protocol information (e.g., Long Term Evolution (LTE) protocol information) for communication with a legacy network or protocol information (e.g., new radio (NR) protocol information) for communication with a 5G network may be stored in the memory 230, and may be accessed by another component (e.g., the processor 120, the first communication processor 212, or the second communication processor 214).

Figure 3:
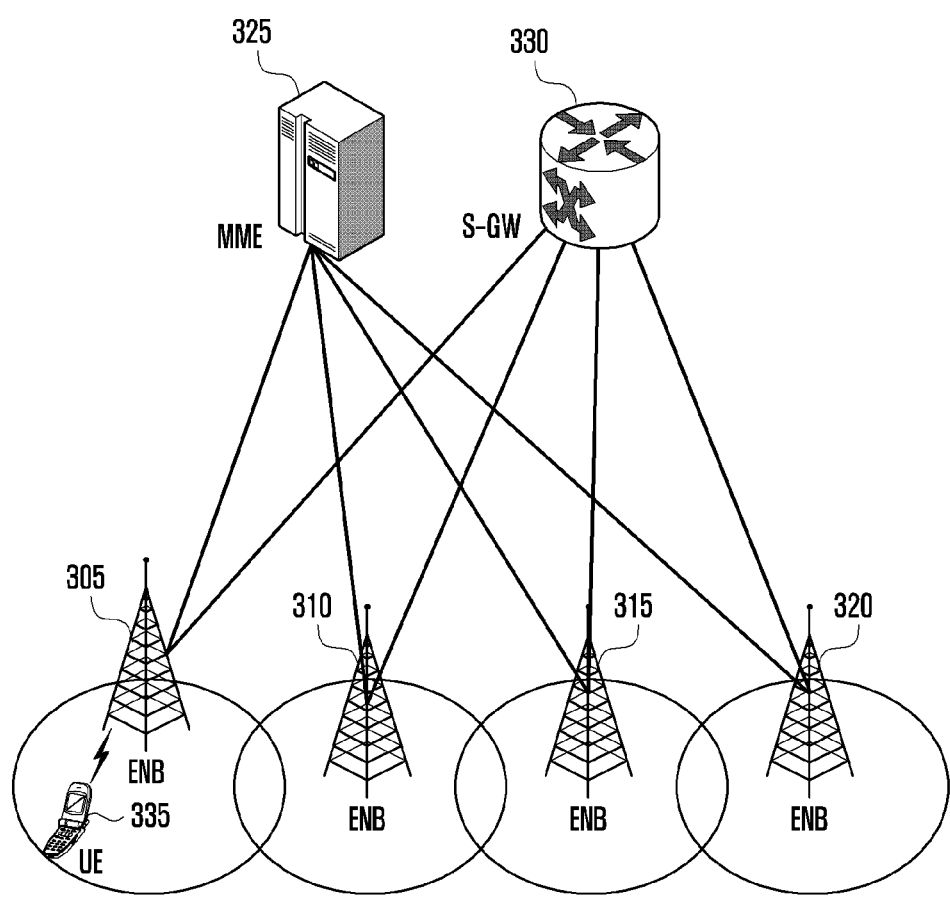
FIG. 3 is a diagram illustrating a structure of an Long Term Evolution (LTE) system according to an embodiment of the disclosure.

FIG. 3 is a diagram illustrating a structure of an LTE system according to an embodiment of the disclosure.

Referring to FIG. 3, a wireless access network of the LTE system may include next generation base stations (evolved node Bs, hereinafter, ENBs, node Bs, or base stations) 305, 310, 315, and 320, a mobility management entity (MME) 325, and a serving gateway (S-GW) 330. A user terminal (user equipment, hereinafter, a UE or a terminal) 335 may access an external network via the ENBs 305, 310, 315, and 320 and the S-GW 330.

In FIG. 3, the ENBs (base stations) 305, 310, 315, and 320 may correspond to a conventional node B of a universal mobile telecommunication system (UMTS). The ENB may be connected to the UE 335 through a wireless channel and perform more complex roles compared to a conventional node B. In the LTE system, all the user traffic including real-time services such as a voice over IP (VoIP), which is performed through the Internet protocol, may be serviced through a shared channel. Therefore, the LTE system may require a device configured to collect pieces of information including a buffer state, an available transmission power state, and a channel state of UEs, and perform scheduling, and the ENBs 305, 310, 315, and 320 may serve as the device.

A single ENB may generally control a plurality of cells. For example, the LTE system may use, as a wireless access technology, for example, orthogonal frequency division multiplexing (OFDM) in a bandwidth of 20 MHz in order to implement a transfer rate of 100 Mbps. Furthermore, the LTE system may apply an adaptive modulation and coding (AMC) scheme for determining a modulation scheme and a channel coding rate according to a channel state of a terminal. The S-GW 330 may be a device configured to provide a data bearer, and may generate or remove a data bearer according to a control of the MME 325. The MME 325 is a device configured to perform various control functions as well as a mobility management function for a terminal, and may be connected to the ENBs 305, 310, 315, and 320.

Figure 4:
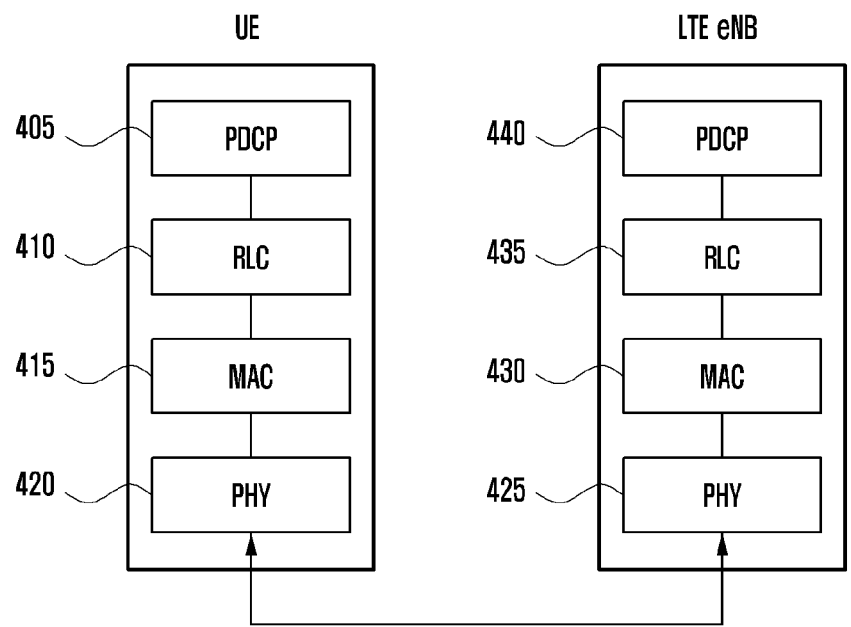
FIG. 4 is a diagram illustrating a wireless protocol structure of an LTE system according to an embodiment of the disclosure.

FIG. 4 is a diagram illustrating a wireless protocol structure of an LTE system according to an embodiment of the disclosure.

Referring to FIG. 4, a wireless protocol of the LTE system may include packet data convergence protocol (PDCP) layers 405 and 440, radio link control (RLC) layers 410 and 435, medium access control (MAC) layers 415 and 430 in a terminal and an ENB, respectively. The PDCP layers 405 and 440 may function to perform an operation such as IP header compression/reconstruction. The main functions of the PDCP layers 405 and 440 may be summarized as follows.

Header compression and decompression (ROHC only)
Transfer of user data
In-sequence delivery (In-sequence delivery of upper layer PDUs at PDCP re-establishment procedure for RLC AM)
Reordering (For split bearers in DC (only support for RLC AM): PDCP PDU routing for transmission and PDCP PDU reordering for reception)
Duplicate detection (Duplicate detection of lower layer SDUs at PDCP re-establishment procedure for RLC AM)
Retransmission (Retransmission of PDCP SDUs at handover and, for split bearers in DC, of PDCP PDUs at PDCP data-recovery procedure, for RLC AM)
Ciphering and deciphering
Timer-based SDU discard (Timer-based SDU discard in uplink)

The radio link control (RLC) layers 410 and 435 may reconfigure a PDCP packet data unit (PDU) to have a proper size, so as to perform an ARQ operation, and the like. The main functions of the RLC layers 410 and 435 may be summarized as follows.

Data transfer (Transfer of upper layer PDUs)
ARQ (Error Correction through ARQ (only for AM data transfer))
   Concatenation, segmentation and reassembly (Concatenation, segmentation and reassembly of RLC SDUs (only for UM and AM data transfer))
Re-segmentation (Re-segmentation of RLC data PDUs (only for AM data transfer))
Reordering (Reordering of RLC data PDUs (only for UM and AM data transfer))
Duplicate detection (Duplicate detection (only for UM and AM data transfer))
Error detection (Protocol error detection (only for AM data transfer))
RLC SDU discard (only for UM and AM data transfer)
RLC re-establishment The MAC layers 415 and 430 may be connected to several RLC layer devices configured in a single terminal, and multiplex RLC PDUs to a MAC PDU, and demultiplex a MAC PDU to RLC PDUs. The main functions of the MAC layers 415 and 430 may be summarized as follows.

Mapping (Mapping between logical channels and transport channels)
Multiplexing and demultiplexing (Multiplexing/demultiplexing of MAC SDUs belonging to one or different logical channels into/from transport blocks (TB) delivered to/from the physical layer on transport channels)
Scheduling information reporting
HARQ (Error correction through HARQ)
Priority handling between logical channels (Priority handling between logical channels of one UE)
Priority handling between terminals (Priority handling between UEs by means of dynamic scheduling)
MBMS service identification
Transport format selection
Padding The physical layers 420 and 425 may perform channel coding and modulation on upper layer data to make the data into an OFDM symbol and transmit the OFDM symbol through a wireless channel, or may perform demodulation and channel-decoding on an OFDM symbol received through a wireless channel, and then transfer the OFDM symbol to an upper layer.

Figure 5:
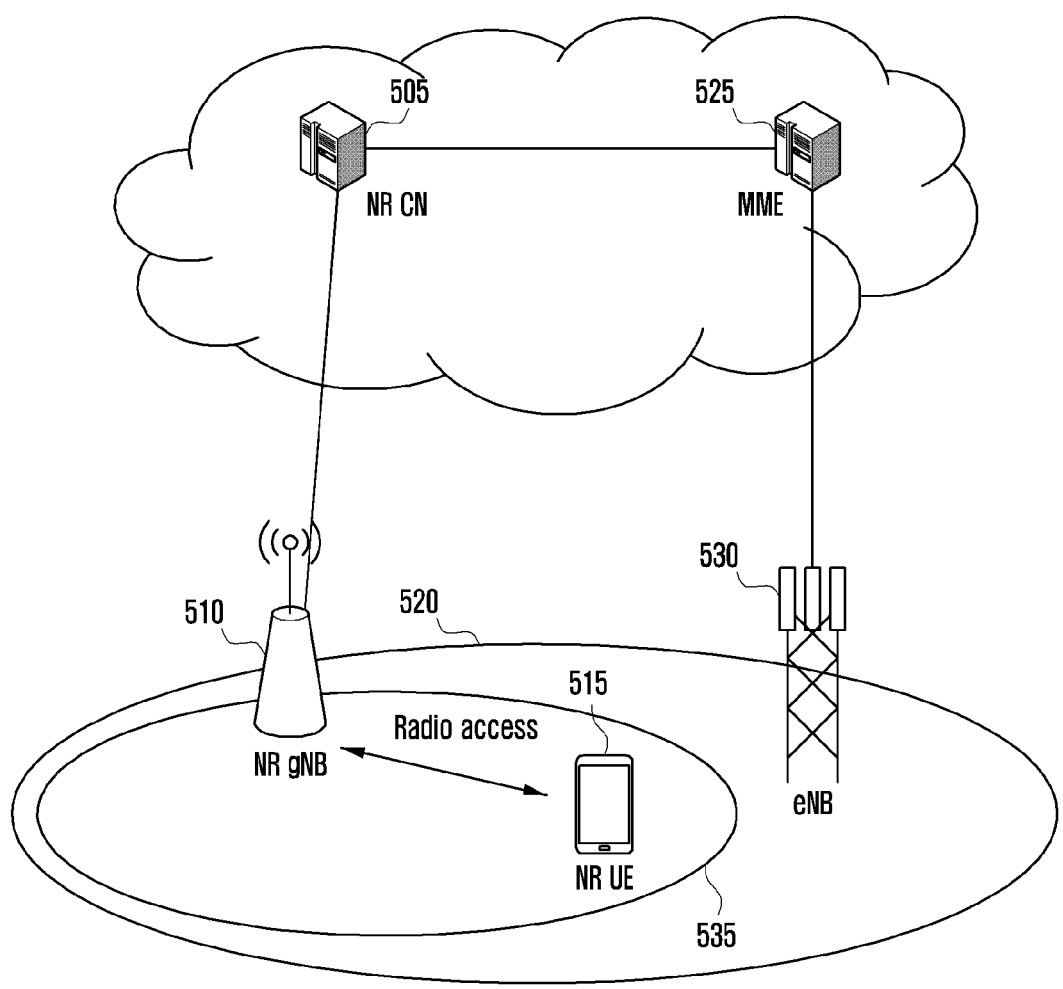
FIG. 5 is a diagram illustrating a structure of a next generation mobile communication system according to an embodiment of the disclosure.

FIG. 5 is a diagram illustrating a structure of a next generation mobile communication system according to an embodiment of the disclosure.

Referring to FIG. 5, a wireless access network of a next generation mobile communication system (hereinafter, NR or 5g) may include a next generation base station (a new radio node B, hereinafter, an NR gNB or an NR base station) 510 and a next generation wireless core network (a new radio core network, NR CN) 505. A next generation wireless user terminal (a new radio user equipment, an electronic device, an NR UE, or a terminal) 515 may access an external network through the NR gNB 510 and the NR CN 505.

In FIG. 5, the NR gNB 510 may correspond to an evolved node B (eNB) of a conventional LTE system. The NR gNB is connected to the electronic device 515 through a wireless channel and may provide an outstanding service compared to a conventional node B. In the NR system, all the user traffic may be serviced through a shared channel. Therefore, the NR system may require a device configured to collect state information, such as a buffer state, an available transmission power state, and a channel state of UEs, and perform scheduling, and the NR gNB 510 may serve as the device. The one NR gNB 510 may generally control a plurality of cells. In order to implement ultra-high speed data transfer compared to the current LTE, the NR system may employ a bandwidth larger than or equal to the current maximum bandwidth. In addition, a beamforming technology may be additionally integrated with orthogonal frequency division multiplexing (OFDM) as a wireless access technology. Furthermore, an adaptive modulation and coding (hereinafter, referred to as an AMC) scheme for determining a modulation scheme and a channel coding rate according to a channel state of a terminal may be applied. According to various embodiments, a 5G wireless communication system may support a further-improved unlicensed band. According to various embodiments, a scenario of solely accessing an unlicensed band may be considered as well as a scenario of accessing an unlicensed band via a licensed band.

The NR CN 505 may perform functions such as mobility support, bearer configuration, and QoS configuration. The NR CN is a device configured to perform various control functions as well as a mobility management function for a terminal, and may be connected to a plurality of base stations. In addition, the NR system may be linked to a conventional LTE system, and the NR CN 505 may be connected to an MME 525 via a network interface. The MME 525 may be connected to an eNB 530 that is a conventional base station.

Figure 6:
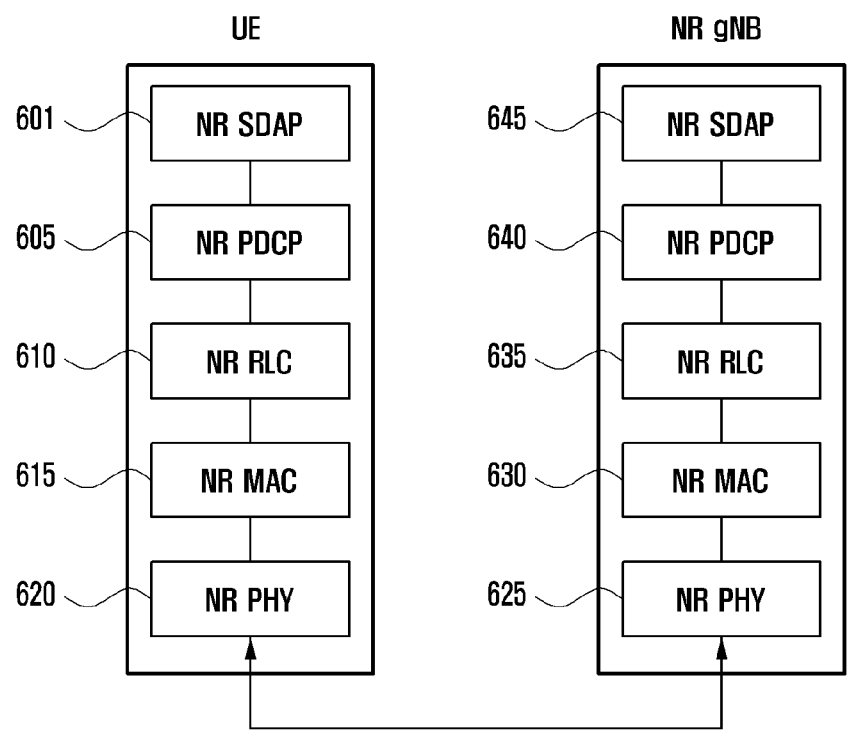
FIG. 6 is a diagram illustrating a wireless protocol structure of a next generation mobile communication system according to an embodiment of the disclosure.

FIG. 6 is a diagram illustrating a wireless protocol structure of a next generation mobile communication system according to an embodiment of the disclosure.

Referring to FIG. 6, a wireless protocol of the next generation mobile communication system may include NR service data adaptation protocol (SDAP) layers 601 and 645, NR PDCP layers 605 and 640, NR RLC layers 610 and 635, NR MAC layers 615 and 630, and NR PHY layers 620 and 625 in a terminal and an NR base station, respectively.

Main functions of the NR SDAP layers 601 and 645 may include some of the following functions.
  Transfer of user data (transfer of user plane data)
  Mapping between a QoS flow and a data bearer for uplink and downlink (mapping between a QoS flow and a DRB for both DL and UL)
  Marking a QoS flow ID in uplink and downlink (marking QoS flow ID in both DL and UL packets)
  Mapping a reflective QoS flow to a data bearer with respect to uplink SDAP PDUs (reflective QoS flow to DRB mapping for the UL SDAP PDUs)

In relation to the SDAP layer, the terminal may receive a configuration relating to whether to use a function of the SDAP layer or whether to use a header of the SDAP layer for each PDCP layer, each bearer, or each logical channel, through a radio resource control (RRC) message. When a SDAP header is configured, the terminal may indicate the terminal to update or reconfigure mapping information relating to a QoS flow and a data bearer for uplink and downlink by using a non-access stratum (NAS) quality of service (QoS) reflective configuration 1-bit indicator (NAS reflective QoS) and an access stratum (AS) QoS reflective configuration 1-bit indicator (AS reflective QoS) of the SDAP header. The SDAP header may include QoS flow ID information indicating a QoS. The QoS information may be used as data processing priority, scheduling information, etc. for smoothly supporting services.

Main functions of the NR PDCP layers 605 and 640 may include some of the following functions.
  Header compression and decompression (ROHC only)
  Transfer of user data
  In-sequence delivery (In-sequence delivery of upper layer PDUs)
  Out-of-sequence delivery (Out-of-sequence delivery of upper layer PDUs)
  Reordering (PDCP PDU reordering for reception)
  Duplicate detection (Duplicate detection of lower layer SDUs)
  Retransmission (Retransmission of PDCP SDUs)
  Ciphering and deciphering
  Timer-based SDU discard (Timer-based SDU discard in uplink)

In the above description, the reordering of the NR PDCP layers 605 and 640 may mean reordering of PDCP PDUs received from a lower layer, according to an order based on a PDCP sequence number (SN). The reordering of the NR PDCP layers 605 and 640 may include a function of transferring data to an upper layer according to a rearranged order, may include a function of directly transferring data without considering an order, may include a function of rearranging an order to record lost PDCP PDUs, may include a function of reporting the state of lost PDCP PDUs to a transmission side, and may include a function of requesting retransmission of lost PDCP PDUs.

Main functions of the NR RLC layers 610 and 635 may include some of the following functions.
  Data transfer (Transfer of upper layer PDUs)
  In-sequence delivery (In-sequence delivery of upper layer PDUs)
  Out-of-sequence delivery (Out-of-sequence delivery of upper layer PDUs)
  ARQ (Error correction through ARQ)
  Concatenation, segmentation and reassembly (Concatenation, segmentation and reassembly of RLC SDUs)
  Re-segmentation (Re-segmentation of RLC data PDUs)
  Reordering (Reordering of RLC data PDUs)
  Duplicate detection
  Error detection (Protocol error detection)
  RLC SDU discard
  RLC re-establishment In the above description, the in-sequence delivery of the NR RLC layers 610 and 635 may mean a function of transferring RLC SDUs received from a lower layer, to an upper layer according to an order. The in-sequence delivery of the NR RLC layers 610 and 635 may include a function of, if a single RLC SDU is divided into several RLC SDUs and then the RLC SDUs are received, reassembling the several RLC SDUs and transmitting the reassembled RLC SDUs.

The in-sequence delivery of the NR RLC layers 610 and 635 may include a function of rearranging received RLC PDUs with reference to a RLC sequence number (SN) or a PDCP sequence number (SN), may include a function of rearranging an order to record lost RLC PDUs, may include a function of reporting the state of lost RLC PDUs to a transmission side, and may include a function of requesting retransmission of lost RLC PDUs.

The in-sequence delivery of the NR RLC layers 610 and 635 may include a function of, if there is a lost RLC SDU, only transferring RLC SDUs before the lost RLC SDU to an upper layer according to an order. In addition, the in-sequence delivery of the NR RLC layers 610 and 635 may include a function of, although there is a lost RLC SDU, if a predetermined timer is expired, transferring, all the RLC SDUs received before the timer has started, to an upper layer according to an order. In addition, the in-sequence delivery of the NR RLC layers 610 and 635 may include a function of, although there is a lost RLC SDU, if a predetermined timer is expired, transferring, all the RLC SDUs received up to the current time point, to an upper layer according to an order.

The NR RLC layers 610 and 635 may process RLC PDUs according to an order in which the RLC PDUs have been received, regardless of an order based on a sequence number (out-of-sequence delivery), and transfer the processed RLC PDUs to the NR PDCP layers 605 and 640.

In a case of segment reception of the NR RLC layers 610 and 635, the NR RLC device may receive segments that have been stored in a buffer or are to be received later, reconfigure the segments into a single intact RLC PDU, and transfer the RLC PDU to the NR PDCP layers 605 and 640.

The NR RLC layers 610 and 635 may not include a concatenation function, and this function may be performed by the NR MAC layers 615 and 630, and may be replaced with a multiplexing function of the NR MAC layers 615 and 630.

In the above description, the out-of-sequence delivery of the NR RLC layers 610 and 635 may mean a function of directly transferring RLC SDUs received from a lower layer, to an upper layer regardless of an order. The out-of-sequence delivery of the NR RLC layers 610 and 635 may include a function of, if a single RLC SDU is divided into several RLC SDUs and then the RLC SDUs are received, reassembling the several RLC SDUs and transmitting the reassembled RLC SDUs. The out-of-sequence delivery of the NR RLC layers 610 and 635 may include a function of storing RLC SNs or PDCP SNs of received RLC PDUs and sequencing the RLC PDUs to record lost RLC PDUs.

The NR MAC layers 615 and 630 may be connected to several NR RLC layers configured in a single terminal, and main functions of the NR MAC layers 615 and 630 may include some of the functions below.

Mapping (Mapping between logical channels and transport channels)
Multiplexing and demultiplexing (Multiplexing/demultiplexing of MAC SDUs)
Scheduling information reporting
HARQ (Error correction through HARQ)
Priority handling between logical channels (Priority handling between logical channels of one UE)
Priority handling between electronic devices (Priority handling between UEs by means of dynamic scheduling)
MBMS service identification
Transport format selection
Padding The NR PHY layers 620 and 625 may perform channel coding and modulation on upper layer data to make the data into an OFDM symbol and transmit the OFDM symbol through a wireless channel, or may perform demodulation and channel-decoding on an OFDM symbol received through a wireless channel, and then transfer the OFDM symbol to an upper layer.

Figure 7:
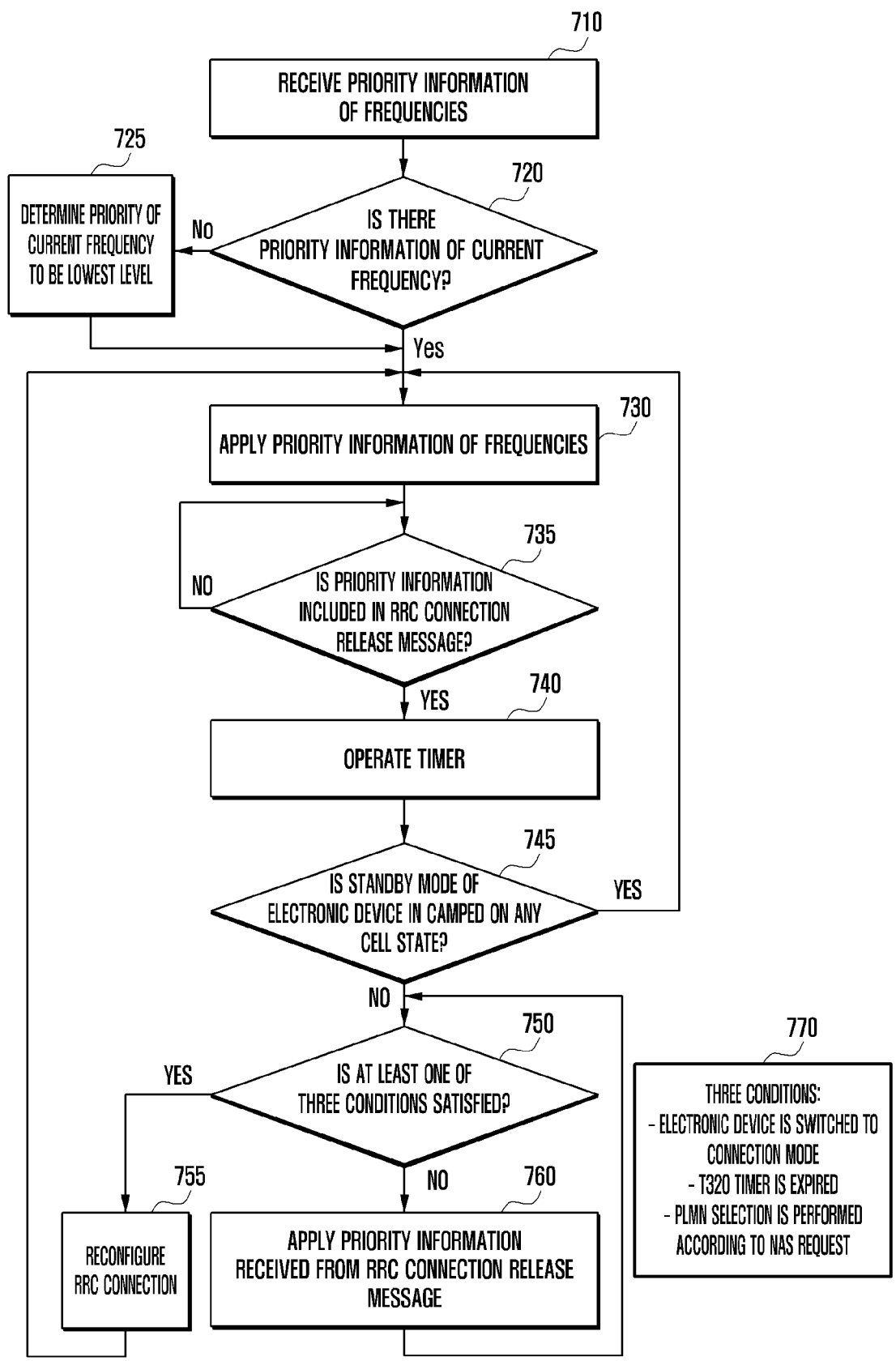
FIG. 7 is an operation flowchart of an electronic device which performs a cell reselection procedure in a next generation mobile communication system according to an embodiment of the disclosure.

FIG. 7 is an operation flowchart of an electronic device which performs a cell selection/reselection procedure in a next generation mobile communication system according to an embodiment of the disclosure.

In a network environment (e.g., the network environment in FIG. 5), an electronic device (e.g., the electronic device 515 in FIG. 5) may camp on a first cell 535 of a NR gNB (e.g., the NR gNB 510 in FIG. 5), and the electronic device 515 may move to a neighbor cell. According to the movement of the electronic device 515, the state of a wireless channel to each cell may be changed. The electronic device 515 may perform a cell reselection procedure of changing a cell connected to the electronic device 515. For example, the electronic device 515 may reselect a different cell (not illustrated) of the same base station (e.g., the NR gNB 510 in FIG. 5), or may reselect a cell (e.g., a cell 520 in FIG. 5) of a different base station (e.g., the eNB 530 in FIG. 5).

According to an embodiment, a network (e.g., at least one of the 4G core network (e.g., the MME 525), the 5G core network (e.g., the NR CN 505), the eNB 530, or the NR gNB 510 in FIG. 5) may assign a priority for each frequency to the electronic device 515 so as to control cell reselection of the electronic device 515 in an RRC idle mode. For example, the network may transmit, to the electronic device 515, priority information of two frequencies (or channels or bands) $f_1$ and $f_2$ available by the electronic device 515, and when $f_1$ has a priority higher than that of $f_2$, the electronic device 515 may have a higher priority of using $f_1$. In addition, even when the electronic device 515 uses $f_2$, if a connection state of $f_2$ is not good, the electronic device 515 may attempt to change the frequency to $f_1$. The priority information of a frequency may be broadcast through system information, or may be provided to the electronic device 515 through an RRC connection release message which is dedicated RRC signaling. Even in a case where the electronic device 515 already has priority information of frequencies through system information, when electronic device-specific (UE-specific) priority information is received through RRC signaling, priority information of a system information block (SIB) may be neglected. The priority information of each frequency may be transferred to the electronic device 515 through a cell reselection priority information element (cellReselectionPriority information element (IE)), and each frequency may be assigned, for example, one of a total of 8-level priorities. As another example, frequencies between radio access technologies (RATs) may not be assigned the same priority. For example, when the electronic device 515 is in an RRC idle mode, has completed cell selection/reselection, and has selected a cell regardless of sameness of a public land mobile network (PLMN) (e.g., camp on any cell state), the electronic device 515 may apply frequency priority information received through system information, and may only store priority information received through RRC signaling without using same. The cell reselection priority information element may be an optional IE. This may imply that the priority information of a frequency has not been assigned. The electronic device 515 may determine the priority of the corresponding frequency corresponds to the lowest level.

Referring to FIG. 7, in operation 710, the electronic device 515 may receive priority information of frequencies. The frequency may be a frequency used in multiple base station (or cells). The priority information of the frequency may be included in system information and then be transmitted to the electronic device 515. However, the priority information may not be necessarily provided for all frequencies. For example, priority information of a frequency of a serving cell on which the electronic device 515 is currently camping may not be provided.

In operation 720, the electronic device 515 may identify the received priority information, and identify whether there is priority information of a frequency of a current serving cell.

According to an embodiment, when the priority information of the frequency of the current serving cell is not provided to the electronic device 515, the electronic device 515 may, in operation 725, determine the priority of the frequency of the serving cell to be the lowest level.

In operation 730, the electronic device 515 may apply the priority information of each frequency.

According to an embodiment, when the electronic device 515 receives an RRC connection release message from the base station (e.g., the NR gNB 510), the electronic device 515 may switch an RRC connection mode (RRC connected) to an RRC idle mode. Priority information of a frequency may be included in the RRC connection release message. According to an embodiment, when the priority information of the frequency is electronic device-specific information, the priority information may be generally applied prior to priority information of a frequency, which is received from an SIB.

In operation 735, the electronic device 515 may identify whether priority information of a frequency is included in the RRC connection release message.

When priority information of a frequency exists, the electronic device 515 may, in operation 740, operate a timer and apply a value of a timer (e.g., T320 timer) included in the RRC connection release message together. T320 timer may be a timer restricting priority.

According to an embodiment, in operation 745, the electronic device 515 may determine whether the current RRC idle mode is in a "camped on any cell state". When the mode of the electronic device 515 is not the "camped on any cell state", the mode of the electronic device 515 may be a "camped normally state". The "camped normally state" may imply a state where the electronic device 515 is camping on a suitable cell. The suitable cell is a cell which can provide a normal service to the electronic device 515, and may indicate a cell satisfying the detailed conditions as below.

The cell corresponds to a selected PLMN, a registered PLMN, or a PLMN within an equivalent PLMN list.

A cell that is not barred.

A cell satisfying a cell selection criterion.

A cell having a corresponding CSG ID existing in a white list of a terminal when the cell is a closed subscriber group (CSG) cell.

A cell having a corresponding service ID existing in a white list of a terminal when the cell is a cell designated to allow a particular service.

The "camped on any cell state" may imply a state where the electronic device 515 fails to camp on a suitable cell, and is camping on an acceptable cell. A general service is impossible in the acceptable cell, and the electronic device 515 can attempt only an emergency call. The acceptable cell may be a cell satisfying the conditions as below.

A cell that is not barred.

A cell satisfying a cell selection criterion.

When the electronic device 515 is in the "camped on any cell state", the electronic device 515 may return to operation 730, and apply frequency priority information provided from an SIB instead of the priority information provided from the RRC connection release message. When the electronic device 515 is not in the "camped on any cell state", and for example, is in the "camped normally", the electronic device 515 may, in operation 750, determine whether at least one of the following three conditions 770 is satisfied.

The three conditions may include the following three conditions: 770

The electronic device 515 is switched to an RRC connection mode

The timer is expired

An PLMN selection operation is performed according to an NAS request

When one of the above conditions is satisfied, the electronic device 515 may, in operation 755, not use the priority information provided from the RRC connection release message, and reconfigure an RRC connection. Thereafter, the electronic device 515 may perform operation 730 again. The electronic device 515 may apply the frequency priority information received from an SIB, when cell reselection is performed. When all the three conditions 770 are not satisfied, the electronic device 515 may, in operation 760, apply the priority information received from the RRC connection release message, when cell reselection is performed.

Meanwhile, a 5G system as described above may consider a scenario of operating in an unlicensed band. This system may be called NR-U or an NR-U system. The unlicensed band may indicate a frequency band defined to be able to be freely used by anybody without a separate license. For example, the unlicensed band may be a 2.4 GHz band, a 5 GHz band, a 6 GHz band, a 7 GHz band, a 60 GHz band, and the like, and a wireless LAN and Bluetooth uses the unlicensed band. An electronic device which is to use the unlicensed band may previously perform listen before talk (LBT) for coexistence with a different communication system (e.g., wireless fidelity (Wi-Fi)) supporting the unlicensed band. The performing of LBT may also be previously required before, for example, a procedure (e.g., a random access procedure) for accessing a network.

As described above, a communication system performing wireless communication in the unlicensed band may be required to inevitably share a resource with a different electronic device or base stations (e.g., a wireless local access network (WLAN), Bluetooth, or a long term evolution licensed assisted access (LTE LAA) terminal) using the unlicensed band. Therefore, for communication within the unlicensed band, competition for resource occupation may be needed. LBT by which a channel situation is checked before data transmission may be required to prevent collision between different electronic devices in resource occupation competition.

A different external electronic device may also occupy the unlicensed band, and thus a particular electronic device is unable to reserve a particular future time point for the unlicensed band. A transmission electronic device and a reception electronic device may consider a method of reserving an interval (window duration) maintained for a particular time rather than reserving a particular time point for the unlicensed band, and attempting to perform transmission and/or reception for the corresponding interval.

Figure 8:
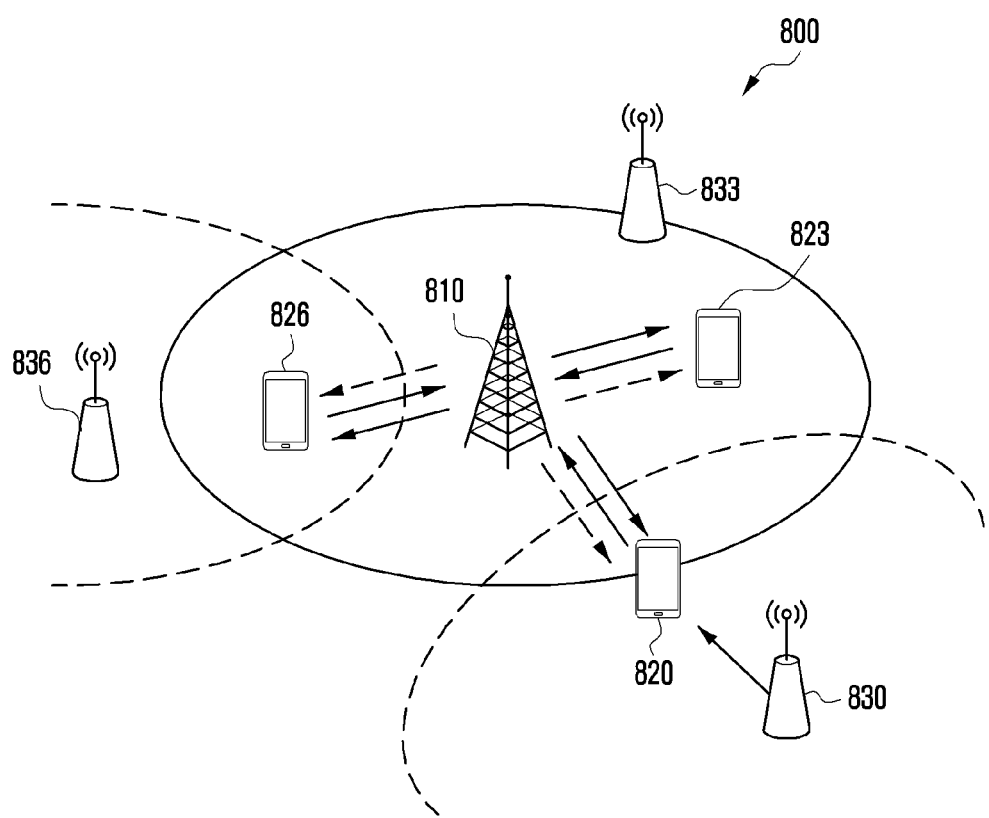
FIG. 8 is a diagram illustrating a wireless communication environment according to an embodiment of the disclosure.

FIG. 8 is a diagram illustrating a wireless communication environment according to an embodiment of the disclosure.

Referring to FIG. 8, a wireless communication environment 800 may include a base station 810, an electronic device 820, and a node 830. Hereinafter, in the disclosure, for convenience of explanation, the base station 810 is described to operate in both a licensed band and an unlicensed band, but this merely corresponds to an example, the disclosure is not limited thereto. According to, the wireless communication environment 800 may include an NR-unlicensed (NR-U) environment according to various embodiments. In addition, according to an embodiment, the wireless communication environment 800 may only include a cellular network (or mobile network) in a licensed band without including an unlicensed band.

The base station 810 is a network infrastructure that provides a wireless access to the electronic device 820 within a coverage. The coverage may be defined as a particular geographic area based on a distance by which the base station 810 can transmit a signal. The base station 810 may provide a service to electronic devices 820, 823, and 826 within the coverage (or cell). The base station 810 may provide an access to an unlicensed band (e.g., a 2.4 GHz band, a 5 GHz band, a 6 GHz band, a 7 GHz band, a 60 GHz band) according to an embodiment. The base station may be called, other than a base station, "an access point (AP)", "an eNodeB (eNB)", "a $5^{th}$ generation (5G) node", "a next generation nodeB (gNB)", "a 5G NodeB (5gNB)", "a wireless point", "a transmission/reception point (TRP)", "a digital unit (DU)", "a radio unit (RU)", "a remote radio head (RRH)", or other terms having a technical meaning equivalent thereto. The base station 810 may perform communication with at least one electronic device within the coverage. The base station 810 is a subject configured to perform resource allocation to the electronic device 820, and may be at least one of a gNode B, an eNode B, a Node B, a base station (BS), a wireless access unit, a base station controller, or a node on a network.

The electronic device 820 is a device used by a user and may perform communication with the base station 810 through a wireless channel. In some cases, at least one of the electronic devices 820 may be operated without involvement of a user. That is, the electronic device 820 is a device performing machine-type communication (MTC) and may not be carried by a user.

The node 830 is a network node that provides a wireless access to the electronic device 820 within an unlicensed band coverage. The node 830 may support a communication system which is able to operate in an unlicensed band. For example, the node 830 may be a device supporting a Wi-Fi communication system. As another example, the node 830 may be a device supporting a wireless local area network (WLAN). As yet another example, the node 830 may be a device supporting a Bluetooth communication system. The node 836 is a network node that provides a wireless access to the electronic device 826 within an unlicensed band coverage. The node 836 may support a communication system which is able to operate in an unlicensed band. For example, the node 836 may be a device supporting a Wi-Fi communication system. As another example, the node 836 may be a device supporting a wireless local area network (WLAN). As yet another example, the node 836 may be a device supporting a Bluetooth communication system.

The wireless communication environment 800 may include the base station 810, the electronic devices 820, 823, and 826, and a node 833. According to an embodiment, the wireless communication environment 800 may be a wireless communication environment in which a licensed band and an unlicensed band coexist. In addition, according to an embodiment, unlike as illustrated in FIG. 8, the wireless communication environment 800 may be a wireless environment including only a cellular network within a licensed band. In addition, according to an embodiment, unlike as illustrated in FIG. 8, the wireless communication environment 800 may be a wireless environment (e.g., standalone (SA) NR-U environment) including only an unlicensed band.

According to various embodiments, the base station 810 and the electronic device 820 may be devices supporting an access in an unlicensed band. The electronic device 820 may attempt to perform an access (e.g., initial access) to the base station 810 on an unlicensed band. The electronic device 820 may receive a synchronization signal and system information from the base station 810, and perform a random access procedure. In an unlicensed band, when a random access preamble is to be transmitted to perform a random access procedure, the electronic device 820 may be required to previously perform listen before talk (LBT) to occupy the unlicensed band. The electronic device 820 may determine whether a different random node occupies a channel in an unlicensed band, as an LBT procedure. The electronic device 820 may determine whether the channel is occupied, through energy detection. For example, when a signal strength equal to or greater than a determined reference value is not detected in the corresponding channel, the electronic device 820 may determine that the corresponding channel is clear. On the contrary, when a signal strength equal to or greater than the determined reference value is detected in the corresponding channel, the electronic device 820 may determine that the corresponding channel is occupied (is busy) by a different node. That is, the base station 810 and the electronic device 820 may occupy a channel after performing an LBT procedure, so as to coexist with the node 830 operating in an unlicensed band. Hereinafter, a channel, which is an object in determination on whether the channel is occupied, may indicate a channel within an unlicensed band.

The electronic device 820 may identify whether a channel is occupied by a node around the electronic device 820, before transmitting a random access preamble. That is, the electronic device 820 may perform LBT. When it is determined that a channel is not occupied by the node 830 around the electronic device 820, the electronic device 820 may transmit a random access preamble. Meanwhile, when the node 830 occupies an unlicensed band, the electronic device 820 may not transmit a random access preamble according to that a channel in the unlicensed band is currently occupied (busy).

As in the above example, when an electronic device does not transmit a random access preamble, access may be delayed due to loss of transmission opportunity. In other words, access delay may occur because success of LBT is previously required for message transmission. The first stage (a random access preamble may be called message (msg) 1) of a random access procedure as a random access preamble has been described as an example, but additional processes may be further included in the random access procedure. The random access preamble may further include, other than transmission of a random access preamble to the base station 810 from the electronic device 820, a random access response (RAR or msg 2) from the base station 810 to the electronic device 820, transmission of identification information (msg 3) from the electronic device 820 to the base station 810, and transmission (msg 4) of a contention resolution message from the base station 810 to the electronic device 820. LBT may also be required in additional processes, and thus delay may occur due to loss of transmission opportunity.

In FIG. 8, a random access for an initial access procedure is described as an example, but the disclosure is not limited thereto. Various embodiments of the disclosure may also be applied, in the same way, to a case where the random access procedure is a non-contention based scheme (e.g., a base station transmits a PDCCH command to an electronic device). In other words, various embodiments of the disclosure may also be applied at the time of transmission of a random access preamble (msg 1) (or called msg A) and/or a random access response (msg 2) (or called msg B) of a 2-step random access procedure as well as a 4-step random access procedure.

According to an embodiment, the base station 810 may inform, for cell reselection, the electronic device 820 of information of a neighbor cell by using system information. According to an embodiment, the system information may include at least one of frequency information of a neighbor cell. According to an embodiment, the system information may include one or more pieces of band information associated with a frequency of the neighbor cell. According to an embodiment, the system information may include at least one information on a cell belonging to each frequency of the neighbor cell. According to an embodiment, the frequency information may include at least one of a center frequency of a frequency of the neighbor cell, a frequency position of an SS/PBCH block, a time position of an SS/PBCH block, a priority of a frequency, and a reference value required for cell reselection. The band information may include information on one or more bands associated with each frequency. The cell information may include at least one of a cell ID and a hysteresis value required for cell reselection. Table 1 below shows a system information block 4 (SIB4) as an example of the system information.

TABLE 1

```
ASN1START
TAG-SIB4-START
IB4 ::=                              SEQUENCE {
    interFreqCarrierFreqList             InterFreqCarrierFreqList,
    lateNonCriticalExtension             OCTET STRING                    OPTIONAL,
    ...
}
InterFreqCarrierFreqList ::=                                SEQUENCE (SIZE (1..maxFreq)) OF
    InterFreqCarrierFreqInfo
InterFreqCarrierFreqInfo ::=         SEQUENCE {
    dl-CarrierFreq                       ARFCN-ValueNR,
    frequencyBandList                    MultiFrequencyBandListNR-SIB    OPTIONAL, -- Cond Mandatory
    frequencyBandListSUL                 MultiFrequencyBandListNR-SIB    OPTIONAL, -- Need R
    nrofSS-BlocksToAverage                                               INTEGER (2..maxNrofSS-BlocksToAverage)OPTIONAL, -- Need R
    absThreshSS-BlocksConsolidation      ThresholdNR                     OPTIONAL, -- Need R
    smtc                                 SSB-MTC                         OPTIONAL, -- Need R
    ssbSubcarrierSpacing                 SubcarrierSpacing,
    ssb-ToMeasure                        SSB-ToMeasure                   OPTIONAL, -- Need R
    deriveSSB-IndexFromCell              BOOLEAN,
    ss-RSSI-Measurement                  SS-RSSI-Measurement             OPTIONAL,
    q-RxLevMin                           Q-RxLevMin,
    q-RxLevMinSUL                        Q-RxLevMin                      OPTIONAL, -- Need R
    q-QualMin                            Q-QualMin                       OPTIONAL, -- Need S,
    p-Max                                P-Max                           OPTIONAL, -- Need R
    t-ReselectionNR                      T-Reselection,
    t-ReselectionNR-SF                   SpeedStateScaleFactors          OPTIONAL, -- Need S
    threshX-HighP                        ReselectionThreshold,
    threshX-LowP                         ReselectionThreshold,
    threshX-Q                            SEQUENCE {
        threshX-HighQ                        ReselectionThresholdQ,
        threshX-LowQ                         ReselectionThresholdQ
    }                                                                    OPTIONAL, -- Cond RSRQ
    cellReselectionPriority              CellReselectionPriority         OPTIONAL, -- Need R
    cellReselectionSubPriority           CellReselectionSubPriority      OPTIONAL, -- Need R
    q-OffsetFreq                         Q-OffsetRange                   DEFAULT dB0,
    interFreqNeighCellList               InterFreqNeighCellList          OPTIONAL, -- Need R
    interFreqBlackCellList               InterFreqBlackCellList          OPTIONAL, -- Need R
    ...
}
InterFreqNeighCellList ::=                                  SEQUENCE (SIZE (1..maxCellInter)) OF
    InterFreqNeighCellInfo
InterFreqNeighCellInfo ::=           SEQUENCE {
    physCellId                           PhysCellId,
    q-OffsetCell                         Q-OffsetRange,
    q-RxLevMinOffsetCell                 INTEGER (1..8)                  OPTIONAL, -- Need R
    q-RxLevMinOffsetCellSUL              INTEGER (1..8)                  OPTIONAL, -- Need R
    q-QualMinOffsetCell                  INTEGER (1..8)                  OPTIONAL, -- Need R
    ...
}
```

TABLE 1-continued

| | |
|---|---|
| InterFreqBlackCellList ::= | SEQUENCE (SIZE (1..maxCellBlack)) OF PCI-Range |
| TAG-SIB4-STOP | |
| ASN1STOP | |

According to an embodiment, system information may be newly defined system information including at least one of parameters included in Table 1. In another embodiment, system information may correspond to an SIB4. In another embodiment, system information may correspond to an SIB5. In another embodiment, system information may include at least one of parameters included in the SIB4 shown in Table 1 in a different SIB type.

According to an embodiment, the base station 810 may include a band for NR-U in system information, and transmit same to the electronic device 820. According to an embodiment, the base station 810 may be a base station operating in a licensed band. According to an embodiment, a base station operating in a licensed band may include information on an NR-U cell in system information, and transmit same. According to another embodiment, a base station operating in a licensed band may include information on a cell operating in a licensed band in system information, and transmit same. As yet another embodiment, the base station may be a base station operating in NR-U. According to an embodiment, a base station operating in NR-U may transmit information on a cell operating in a licensed band by using system information. According to another embodiment, a base station operating in NR-U may transmit information on a cell operating in NR-U by using system information.

According to an embodiment, the electronic device may identify, based on predefined information, whether a frequency is for NR-U. As described above, at least a part of information (e.g., band information defined for NR-U) of Table 2 and Table 3 may be stored in the electronic device, and the electronic device may perform, based on the stored information, identification through a comparison with band information included in received system information. As another example, as described below, a method of storing at least a part of information (e.g., band information defined for NR-U) of predefined Table 2 and Table 3 in the electronic device, and performing, based on the stored information, identification through a comparison with frequency information included in received system information may be possible.

According to an embodiment, a band for NR-U may be defined as a new band. To this end, at least one of a frequency position (NR-ARFCN) of each band, a transmission type (TDD/FDD), SCS of an SS/PBCH, and information on SCS available in data transmission may be determined for the new band. In addition, bands can be combined with a different licensed band in a dual connectivity (DC) or carrier aggregation (CA) scheme. Table 2 and Table] below may be an example for band nXX newly defined for NR-U.

TABLE 2

NR operating bands in FR1

| NR operating band | Uplink (UL) operating band BS receive/UE transmit $F_{UL\_low}$-$F_{UL\_high}$ | Downlink (DL) operating band BS transmit/UE receive $F_{DL\_low}$-$F_{DL\_high}$ | Duplex Mode |
|---|---|---|---|
| nXX | Aaaa MHz-Bbbb MHz | Cccc MHz-Dddd MHz | NR-U[y)] |

NOTE 1:
UE that complies with the NR Band n50 minimum requirements in this specification shall also comply with the NR Band n51 minimum requirements.
NOTE 2:
UE that complies with the NR Band n75 minimum requirements in this specification shall also comply with the NR Band n76 minimum requirements.
NOTE:
[y)]UE supporting Band nXX shall meet the requirements for NR-U operation

TABLE 3

Channel bandwidths for each NR band

NR band/SCS/UE Channel bandwidth

| NR Band | SCS kHz | 5 MHz | 10[1, 2] MHz | 15[2] MHz | 20[2] MHz | 25[2] MHz | 30 MHz | 40 MHz | 50 MHz | 60 MHz | 80 MHz | 90 MHz | 100 MHz |
|---|---|---|---|---|---|---|---|---|---|---|---|---|---|
| nXX | 15 | | Yes | Yes | Yes | | | Yes | Yes | | | | |
| | 30 | | Yes | Yes | Yes | | | Yes | Yes | Yes | Yes | Yes[4] | Yes |
| | 60 | | Yes | Yes | Yes | | | Yes | Yes | Yes | Yes | Yes[4] | Yes |

NOTE:
[1]90% spectrum utilization may not be achieved for 30 kHz SCS.
NOTE:
[2]90% spectrum utilization may not be achieved for 60 kHz SCS.
NOTE 3:
This UE channel bandwidth is applicable only to downlink.
NOTE:
[4]This UE channel bandwidth is optional.

According to another embodiment, the electronic device may determine whether the use is for NR-U, based on a parameter included in system information. An indicator (indication) indicating NR-U may be newly defined in the system information. According to an embodiment, a method of including an indicator (indication) indicating an NR-U band in each band information according to Table 4 below may be possible. A case where NR-U-feature is indicated by 1 may indicate an NR-U cell, and the remaining cases may indicate a normal cell. According to an embodiment, a frequency not including a NR-U-feature parameter below may be determined as a frequency including only a normal cell.

system information or the RRC signaling is an NR-U band, based on predefined information.

In operation 930, the electronic device 101 may determine a frequency priority, based on the identified support or non-support of NR-U by the electronic device 101, and the received system information or RRC signaling. The electronic device 101, for example, the electronic device 101 (or an electronic device supporting an NR-U band) supporting NR-U may put a high priority on a frequency associated with an NR-U band. According to another embodiment, the electronic device 101 supporting NR-U may put a low priority on a frequency associated with an NR-U band. According to another embodiment, the electronic device 101

TABLE 4

```
ASN1START
TAG-MULTIFREQUENCYBANDLISTNR-SIB-START
MultiFrequencyBandListNR-SIB ::=           SEQUENCE (SIZE (1..maxNrofMultiBands))
OF NR-MultiBandInfo
NR-MultiBandInfo ::=            SEQUENCE {
freqBandIndicatorNR                   FreqBandIndicatorNR   OPTIONAL,   -- Cond
OptULNotSIB2
nr-NS-PmaxList                 NR-NS-PmaxList   OPTIONAL   -- Need S
nr-U-feature                   Boolean    OPTIONAL   -- Cond OptULNotSIB2
}
TAG-MULTIFREQUENCYBANDLISTNR-SIB-STOP
ASN1STOP
```

In yet another embodiment, a method of identifying, by the electronic device, whether a frequency is a frequency for NR-U, based on information included in system information, may be possible. For example, the last band of at least two bands included in MultiFrequencyBandListNR-SIB may be an NR-U band. In another embodiment, the electronic device 820 may determine that at least one band included in a newly defined new IE (e.g., MultiFrequencyBandListNRU-SIB) is an NR-U band, in a scheme similar to a case of MultiFrequencyBandListNR-SIB.

Figure 9:
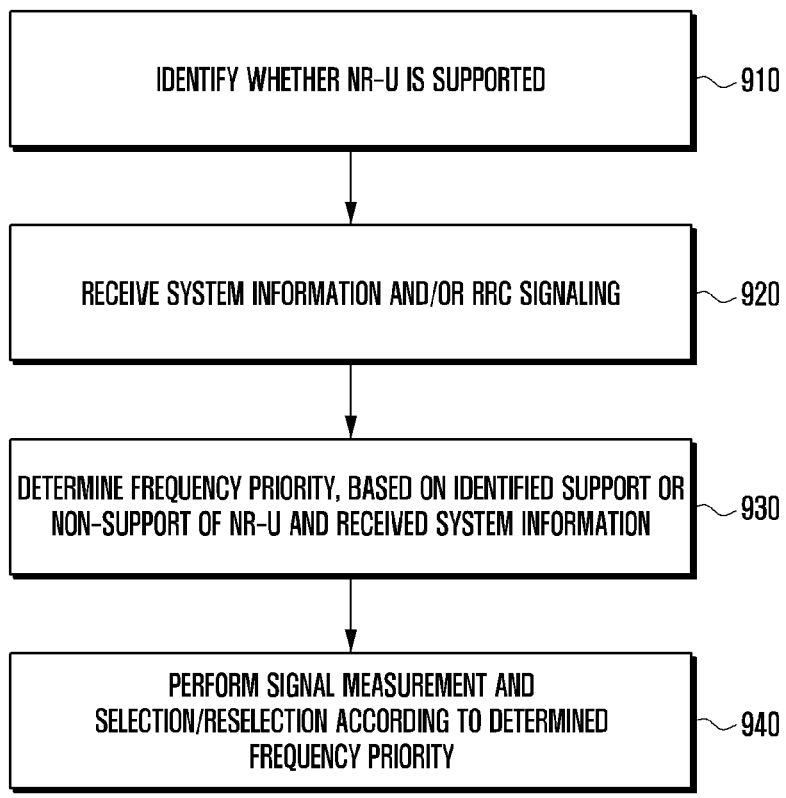
FIG. 9 is an operation flowchart by which an electronic device adjusts a priority of a frequency band or a band including a new radio-unlicensed (NR-U) cell so as to perform cell selection/reselection according to an embodiment of the disclosure.

FIG. 9 is a diagram illustrating a process of adjusting, by an electronic device, a priority of a frequency band or a band including a NR-U cell so as to perform cell selection/reselection according to an embodiment of the disclosure.

In operation 910, an electronic device (e.g., the electronic device 101 in FIG. 1) may identify whether the electronic device supports NR-U.

Referring to FIG. 9, according to an embodiment, identification of whether NR-U is supported may be performed based on information stored in the electronic device 101. According to another embodiment, identification of whether NR-U is supported may be performed based on subscription information of the electronic device 101, which is received from a base station. For example, the electronic device 101 may be a member of a calling plan supporting NR-U.

In operation 920, the electronic device 101 may receive system information or RRC signaling from a serving cell. The system information may be system information (e.g., an SIB4 or an SIB5) received in an RRC idle state. According to another embodiment, the RRC signaling may be an RRC connection release message. According to an embodiment, priority information of a frequency or a band may be included in the system information or the RRC signaling transmitted by the serving cell. According to an embodiment, the system information or the RRC signaling may include information indicating that a particular band is an NR-U band. As another example, the electronic device 101 may identify whether a particular band included in the system information or the RRC signaling is an NR-U band, based on predefined information.

may determine a frequency priority, based on information received from the base station through system information or an RRC message regardless of whether the system information or the RRC message includes information indicating an NR-U band.

In operation 940, the electronic device 101 may, according to an embodiment, measure a signal according to the frequency priority determined in the previous operation, and perform a cell selection/reselection process. The operation of measuring a signal may include at least one of an operation of searching for a cell, based on frequency information or band information included in system information or RRC signaling, an operation of identifying a recognition number of a cell, an operation of measuring a channel quality of a cell, or an operation of receiving system information or RRC signaling associated with a cell.

According to an embodiment, an electronic device not supporting NR-U may not measure a frequency band or a band known as an NR-U band. For example, in a case of a frequency associated with only an NR-U band in frequency information received through system information or RRC signaling, the corresponding frequency may be excluded from a list which the electronic device is required to measure. An electronic device not supporting NR-U may determine the frequency priority of a frequency at which a cell in a licensed band operates, based on information received from a base station through system information or an RRC message. When at least one of a frequency list or a band list required to be measured is determined to be an NR-U band, an electronic device not supporting NR-U may not measure a corresponding frequency or band. According to another embodiment, an electronic device not supporting NR-U may determine a frequency priority, based on information received from a base station through system information or an RRC message regardless of whether an NR-U band is included. According to an embodiment, the signal measurement operation may be performed in a case where the electronic device is in an RRC connection mode. According to an embodiment, the signal measurement operation may be performed in a case where the electronic device is in an RRC idle mode.

Figure 10:
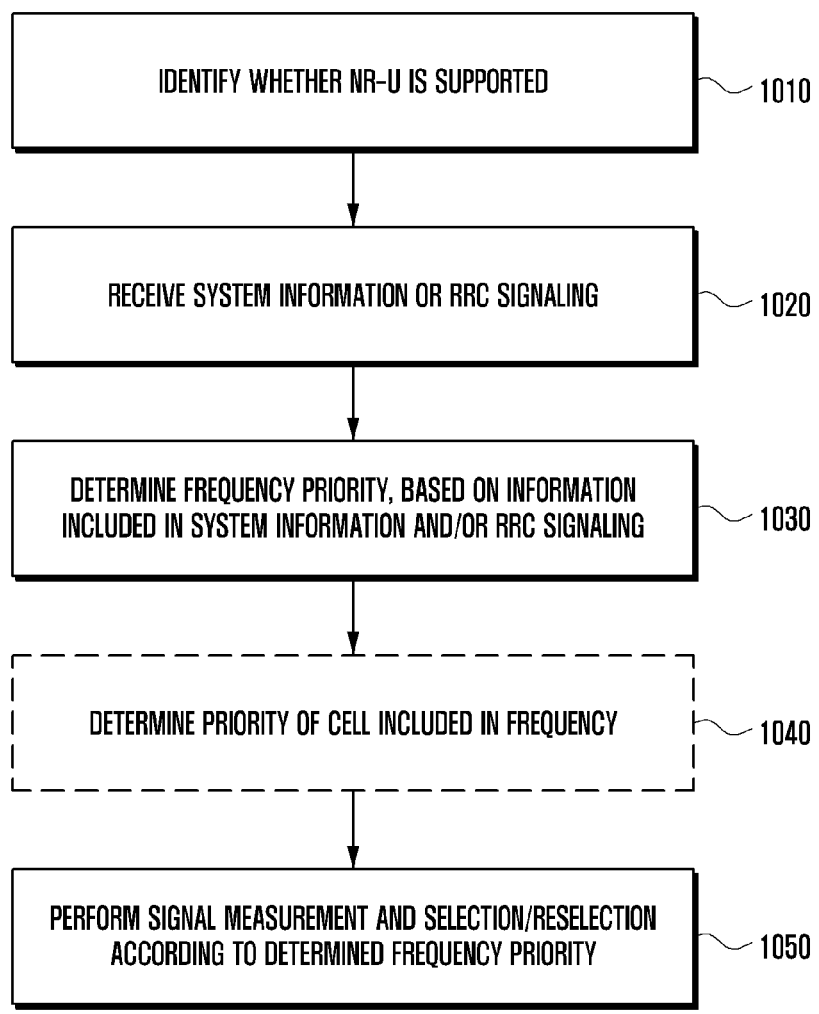
FIG. 10 is a diagram illustrating a process of adjusting, by an electronic device, a priority of an NR-U cell so as to perform cell selection/reselection according to an embodiment of the disclosure.

FIG. 10 is an operation flowchart by which an electronic device adjusts a priority of an NR-U cell so as to perform cell selection/reselection according to an embodiment of the disclosure.

In operation 1010, an electronic device (e.g., the electronic device 101 in FIG. 1) may identify whether the electronic device supports NR-U.

Referring to FIG. 10, according to an embodiment, identification of whether NR-U is supported may be performed based on information stored in the electronic device 101. According to another embodiment, identification of whether NR-U is supported may be performed based on subscription information of the electronic device 101, which is received from a base station. For example, the electronic device 101 may be a member of a calling plan supporting NR-U.

In operation 1020, the electronic device 101 may receive system information or RRC signaling from a serving cell. The system information may be system information (e.g., an SIB4 or an SIB5) received in an RRC idle state. According to another embodiment, the RRC signaling may be an RRC connection release message. According to an embodiment, priority information of a frequency or a band may be included in the system information transmitted by the serving cell. According to an embodiment, the system information may include information indicating that a particular cell is an NR-U cell. According to an embodiment, the electronic device 101 may identify an NR-U band, based on the system information.

According to an embodiment, a PLMN ID may be newly defined for an NR-U cell. One cell may include at least one PLMN ID. According to an embodiment, a separate PLMN ID is configured for an NR-U base station, and thus the electronic device 101 can perform a procedure of changing a PLMN so as to operate in an NR-U cell. Alternatively, it may be possible to define PLMN IDs having different priorities for a cell within a licensed band and an NR-U cell.

According to an embodiment, a base station may inform, by using system information, the electronic device 101 that a particular cell is an NR-U cell. According to an embodiment, Table 5 below may be a signaling example of indicating that a neighbor cell is an NR-U cell, by using a part of system information transmitted by a serving base station to the electronic device 101. In Table 5 below, an NR-U-feature parameter may be information indicating whether a cell (physCellId) included in the same InterFreqNeighCellInfo supports NR-U. For example, when True (e.g., the value is 1) is indicated in NR-U-feature below, this may imply that a corresponding cell supports NR-U, and otherwise, for example, when False (e.g., the value is 0) is indicated in NR-U-feature, the corresponding cell may be considered as a normal cell. According to another embodiment, a cell not including a NR-U-feature parameter below may be considered as a normal cell. According to another embodiment, a frequency not including a NR-U-feature parameter below may be considered as a frequency including only a normal cell. According to another embodiment, a cell supporting NR-U may be a cell at the last position of a cell list included in InterFreqNeighCellList. According to another embodiment, a list for a cell supporting NR-U may be newly defined (e.g., InterFreqNeighNRUCellList) so as to transmit information on NR-U cells to the electronic device.

TABLE 5

| InterFreqNeighCellList :: InterFreqNeighCellInfo | SEQUENCE (SIZE (1..maxCellInter)) OF | | |
|---|---|---|---|
| InterFreqNeighCellInfo ::= | SEQUENCE { | | |
| physCellId | PhysCellId, | | |
| NR-U-feature | Boolean, | | |
| q-OffsetCell | Q-OffsetRange, | | |
| q-RxLevMinOffsetCell | INTEGER (1..8) | OPTIONAL, -- Need R | |
| q-RxLevMinOffsetCellSUL | INTEGER (1..8) | OPTIONAL, -- Need R | |
| q-QualMinOffsetCell | INTEGER (1..8) | OPTIONAL, -- Need R | |
| ... | | | |
| } | | | |

In operation 1030, the electronic device 101 may, according to an embodiment, determine a frequency priority, based on information received through system information or RRC signaling. According to an embodiment, an electronic device supporting NR-U may preferentially measure a signal of a cell designated as an NR-U cell at a corresponding frequency, based on cell information. For example, only a signal of an NR-U cell in frequency information received through system information or RRC signaling may be measured. The frequency priorities of the remaining frequencies and cells may be determined based on information received from the base station through system information or RRC signaling.

According to an embodiment, when it is determined, based on cell information, that only an NR-U cell exists at a corresponding frequency, the electronic device 101 not supporting NR-U may not measure the corresponding frequency or band. For example, when at least one cell within a licensed band is included in information received through system information or RRC signaling, the corresponding frequency may be measured. The frequency priorities of the remaining frequencies and cells may be determined based on information received from the base station through system information or RRC signaling.

In operation 1040, the electronic device 101 may, according to an embodiment, determine the priorities of cells included in each frequency, based on whether NR-U is supported. According to an embodiment, operation 1040 may be optionally performed. According to an embodiment, the electronic device 101 supporting NR-U may preferentially measure a cell designated as an NR-U cell at a corresponding frequency, based on cell information. For example, the electronic device 101 may measure only an NR-U cell in frequency information received through system information or RRC signaling. The frequency priorities of the remaining frequencies and cells may be determined based on information received from the base station through system information or RRC signaling. According to an embodiment, the electronic device 101 supporting NR-U may process an NR-U cell and a normal cell on different priorities at a frequency at which the NR-U cell and the normal cell operate together. According to an embodiment, the electronic device 101 supporting NR-U may measure an NR-U cell on a priority higher than that of a normal cell at a frequency at which the NR-U cell and the normal cell operate together. According to another embodiment, the electronic device 101 may measure an NR-U cell on a priority lower than that of a normal cell. According to yet another embodiment, the electronic device 101 may determine a cell priority, based on information received from a base station through system information or RRC signaling regardless of whether an NR-U cell is supported.

According to an embodiment, an electronic device not supporting NR-U may not measure a signal of a cell designated as an NR-U cell at a corresponding frequency, based on cell information. For example, the electronic device may not measure a signal of an NR-U cell in frequency information received through system information or RRC signaling. The frequency priorities of the remaining frequencies and cells may be determined based on information received from the base station through system information or RRC signaling.

In operation 1050, the electronic device may, according to an embodiment, perform a signal measurement operation according to the frequency or cell priority determined in the previous operation, and perform a cell selection/reselection operation. The signal measurement operation may include at least one of an operation of searching for a cell, based on frequency information or band information included in system information or RRC signaling, an operation of identifying a recognition number of a cell, an operation of measuring a channel quality of a cell, or an operation of receiving system information associated with a cell. According to another embodiment, an electronic device not supporting NR-U may determine a frequency priority, based on information received from a base station through system information or RRC signaling regardless of whether an NR-U band is included. According to an embodiment, the signal measurement operation may be performed in a case where the electronic device is in an RRC connection mode. According to an embodiment, the signal measurement operation may be performed in a case where the electronic device is in an RRC idle mode.

According to an embodiment, the priority of a cell may be determined based on information stored in the electronic device 101. According to another embodiment, the priority of a cell may be determined based on subscription information of the electronic device 101, which is received from a base station.

According to various embodiments, a non-terrestrial network (NTN) cell may coexist with normal cells in a 5G system. An NTN cell may indicate a cell using an NR-based non-terrestrial network (e.g., satellite) as a base station.

According to an embodiment, a serving cell included in a normal base station may include information related to a band used in a NTN in system information or RRC signaling and transmit same to an electronic device (e.g., the electronic device 101 in FIG. 1). Particularly, the normal base station may be a base station operated based on a wired backhaul or a wireless backhaul. According to an embodiment, the normal base station may include information on an NTN cell in system information or RRC signaling and transmit same. According to an embodiment, the normal base station may include an indicator (indication) indicating whether a serving cell is a wired backhaul cell or a wireless backhaul cell, or an NTN cell in system information or RRC signaling and transmit same. According to various embodiments, the normal base station may include an indicator (indication) indicating whether a serving cell is an NTN cell in system information or RRC signaling and transmit same. According to an embodiment, the normal base station may include an indicator (indication) indicating whether each of neighbor cells is a wired backhaul cell or a wireless backhaul cell, or an NTN cell in system information or RRC signaling and transmit same. In another embodiment, an NTN base station may also transmit, to the electronic device 101, system information or RRC signaling transmitted by the normal base station. According to an embodiment, an NTN cell may transmit information on a neighboring wireless backhaul cell or wired backhaul cell by using system information or RRC signaling. According to another embodiment, the NTN base station may transmit information on a cell operated based on an NTN by using system information or RRC signaling.

According to another embodiment, the electronic device 101 may identify, based on predefined information, whether a band is for an NTN. As described above, a method of storing at least a part of information (band information defined for NTN) of Table 6 and Table 7 in a terminal, and performing, based on the stored information, identification through a comparison with band information included in received system information or RRC signaling may be possible. As another embodiment, as described below, at least a part of information (band information defined for NTN) of Table 6 and Table 7 may be stored in an electronic device, and identification may be performed based on the stored information through a comparison with frequency information included in received system information or RRC signaling.

According to an embodiment, a new band may be defined as a band for an NTN. To this end, at least one of a frequency position (NR-ARFCN) of each band, a transmission type (TDD/FDD), SCS of an SS/PBCH, and information on SCS available in data transmission may be determined for the new band. Frequency band information of a neighbor frequency or a neighbor cell may be broadcast through system information or RRC signaling. Several pieces of frequency band information may be transmitted with respect to one frequency/cell. The frequency band information may be a frequency band identifier, and the frequency band identifier may be an integer/natural number within a predetermined range. When at least one frequency band identifier is an NTN-dedicated band identifier with respect to a frequency/cell corresponding to several frequency band identifiers, the electronic device 101 may consider the corresponding frequency/cell as a frequency/cell supporting an NTN, and perform an operation described later. Alternatively, one piece of frequency band information may be configured by several identifiers, each identifier is an integer/natural number within a predetermined range, and each identifier may be a value indicating a frequency band of a corresponding frequency/cell in a particular RAT. Bands can be combined with a different licensed band in a DC or CA scheme. Table 6 and Table 7 below show an example of band nXX defined for an NTN.

TABLE 6

| | NR operating bands in FR1 | | |
|---|---|---|---|
| NR operating band | Uplink (UL) operating band BS receive/UE transmit $F_{UL\_low}$-$F_{UL\_high}$ | Downlink (DL) operating band BS transmit/UE receive $F_{DL\_low}$-$F_{DL\_high}$ | Duplex Mode |
| nXX | Aaaa MHz-Bbbb MHz | Cccc MHz-Dddd MHz | NTN[p)] |

NOTE 1:
UE that complies with the NR Band n50 minimum requirements in this specification shall also comply with the NR Band n51 minimum requirements.
NOTE 2:
UE that complies with the NR Band n75 minimum requirements in this specification shall also comply with the NR Band n76 minimum requirements.
NOTE:
[p)]UE supporting Band nXX shall meet the requirements for NTN operation

TABLE 7

| | Channel bandwidths for each NR band | | | | | | | | | | | |
|---|---|---|---|---|---|---|---|---|---|---|---|---|
| | NR band/SCS/UE Channel bandwidth | | | | | | | | | | | |
| NR Band | SCS kHz | 5 MHz | 10[1, 2] MHz | 15[2] MHz | 20[2] MHz | 25[2] MHz | 30 MHz | 40 MHz | 50 MHz | 60 MHz | 80 MHz | 90 MHz | 100 MHz |
| nXX | 15 | Yes | Yes | Yes | | | | Yes | Yes | | | | |
| | 30 | | Yes | Yes | Yes | | | Yes | Yes | Yes | Yes | Yes[4] | Yes |
| | 60 | | Yes | Yes | Yes | | | Yes | Yes | Yes | Yes | Yes[4] | Yes |

NOTE:
[1]90% spectrum utilization may not be achieved for 30 kHz SCS.
NOTE:
[2]90% spectrum utilization may not be achieved for 60 kHz SCS.
NOTE 3:
This UE channel bandwidth is applicable only to downlink.
NOTE:
[4]This UE channel bandwidth is optional in this release of the specification.

According to various embodiments, the electronic device 101 may identify, based on a parameter included in system information or RRC signaling for a neighbor cell, whether the neighboring cell is for an NTN. An indicator (indication) indicating an NTN may be included in system information or RRC signaling for a neighbor cell. According to an embodiment, an indicator (indication) indicating an NTN band may be included in each band information according to Table 8 below. When True (e.g., the value is 1) is indicated in NTN-feature below, a corresponding cell may indicate an NTN cell, and otherwise (for example, when False (e.g., the value is 0) is indicated in NTN-feature, the corresponding cell may indicate a normal cell. According to an embodiment, the electronic device 101 may determine a cell not including a NTN-feature parameter below as a normal cell.

According to an embodiment, a frequency not including a NTN-feature parameter below may be determined as a frequency including only a normal cell.

TABLE 8

```
ASN1START
TAG-MULTIFREQUENCYBANDLISTNR-SIB-START
MultiFrequencyBandListNR-SIB ::=    SEQUENCE (SIZE (1..
maxNrofMultiBands)) OF NR-MultiBandInfo
NR-MultiBandInfo ::=    SEQUENCE {
freqBandIndicatorNR    FreqBandIndicatorNR    OPTIONAL,    -- Cond
OptULNotSIB2
nr-NS-PmaxList    NR-NS-PmaxList    OPTIONAL    -- Need S
NTN-feature    Boolean    OPTIONAL    -- Cond OptULNotSIB2
}
TAG-MULTIFREQUENCYBANDLISTNR-SIB-STOP
ASN1STOP
```

According to various embodiments, the electronic device 101 may identify, based on information included in system information or RRC signaling, a frequency for an NTN. Specifically, the last band of at least two bands included in MultiFrequencyBandListNR-SIB may be an NTN band. According to another embodiment, a method of newly defining a band list (e.g., MultiFrequencyNTNBandListNR-SIB) for an NTN cell are also possible.

According to various embodiments of the disclosure, the electronic device 101 may identify, based on a parameter included in system information or RRC signaling for a neighbor cell, whether the neighboring cell is for an NTN. One cell may be operated based on at least one PLMN.

Information on a PLMN may include a PLMN ID in system information. According to various embodiments, a separate PLMN ID for an NTN may be defined. For example, the electronic device 101 may determine, as a normal cell, a cell operated based on a PLMN having a PLMN ID of 450 01. In addition, the electronic device 101 may determine, as an NTN cell, a cell operated based on a PLMN having a PLMN ID of 450 51. According to an embodiment, the corresponding two PLMN IDs may correspond to PLMNs operated by the same service provider. Frequency band information of a neighbor frequency or a neighbor cell may be broadcast through system information or RRC signaling. Several pieces of frequency band information may be transmitted with respect to one frequency/cell. The frequency band information may be a frequency band identifier, and the frequency band identifier may be an integer/natural number within a predetermined range. When at least one frequency band identifier is an NTN-dedicated band identifier with respect to a frequency/cell corresponding to several frequency band identifiers, the electronic device 101 may consider the corresponding frequency/cell as a frequency/cell supporting an NTN, and perform an operation described later. Alternatively, one piece of frequency band information may be configured by several identifiers, each identifier is an integer/natural number within a predetermined range, and each identifier may be a value indicating a frequency band of a corresponding frequency/cell in a particular RAT.

According to various embodiments, a normal base station may include an indicator indicating whether a neighbor cell is an NTN cell or a wired/wireless-based backhaul cell in system information or RRC signaling, and transmit same. According to an embodiment, the normal base station may be a wired backhaul base station or a wireless backhaul base station. According to various embodiments, the normal base station may transmit information on a neighboring NTN cell to the electronic device by using system information or RRC signaling. The system information or RRC signaling may include an indicator indicating whether the cell is an NTN cell or a wired/wireless backhaul-based cell.

According to another embodiment, an NTN base station may transmit information on a cell operated based on an NTN by using system information or RRC signaling. According to an embodiment, an NTN cell may transmit information on a neighboring wireless backhaul cell or wired backhaul cell through system information or RRC signaling. According to various embodiments, the NTN base station may transmit information on a neighboring NTN cell through system information or RRC signaling. The system information or RRC signaling may include an indicator indicating whether the cell is an NTN cell or a wired/ wireless backhaul-based cell. For example, this may be informed of through NTN-feature in Table 9 in system information or RRC signaling transmitted by the base station. For example, when True (e.g., the value is 1) is indicated in an NTN-feature parameter, a corresponding cell may indicate an NTN cell, and otherwise (for example, when False (e.g., the value is 0) is indicated in an NTN-feature parameter, the corresponding cell may indicate a wired backhaul cell or a wireless backhaul cell. In an embodiment, the electronic device 101 may determine a cell not including an NRN-feature parameter below as a wired/ wireless backhaul-based cell.

TABLE 9

| | |
|---|---|
| InterFreqNeighCellList ::= | SEQUENCE (SIZE (1..maxCellInter)) OF InterFreqNeighCellInfo |
| InterFreqNeighCellInfo ::= | SEQUENCE { |
| physCellId | PhysCellId, |
| NTN-feature | Boolean, |
| q-OffsetCell | Q-OffsetRange, |
| q-RxLevMinOffsetCell | INTEGER (1..8)   OPTIONAL, -- Need R |
| q-RxLevMinOffsetCellSUL | INTEGER (1..8)   OPTIONAL, -- Need R |
| q-QualMinOffsetCell | INTEGER (1..8)   OPTIONAL, -- Need R |
| ... | |
| } | |

Figure 11:
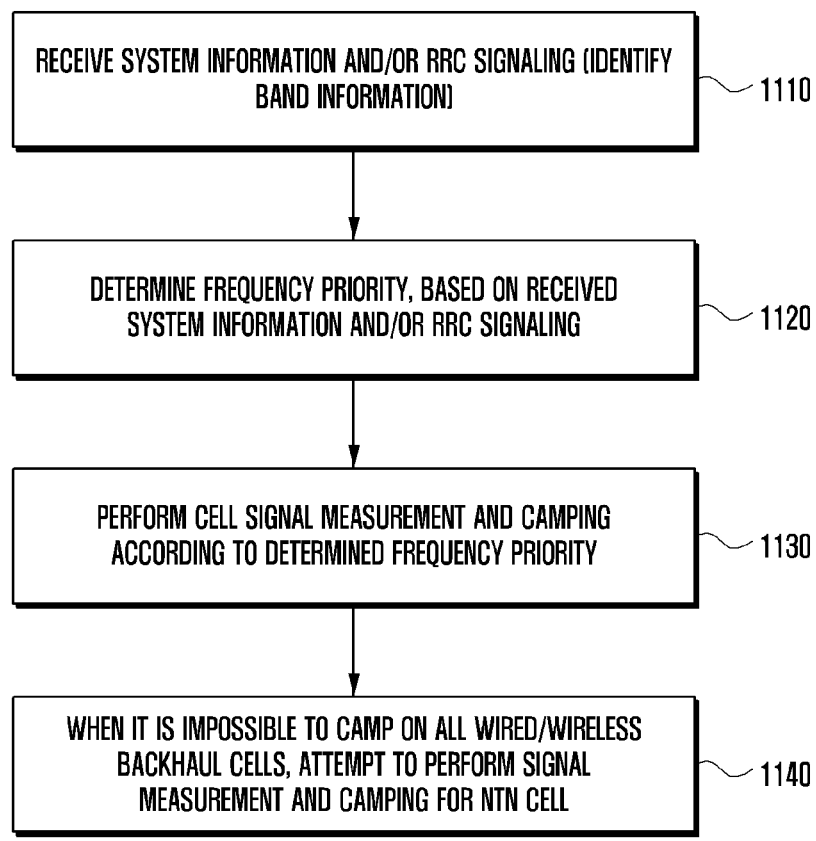
FIG. 11 is a block diagram illustrating a process of adjusting, by an electronic device, priorities of non-terrestrial network (NTN) cells, based on system information, so as to perform cell selection/reselection according to an embodiment of the disclosure.

FIG. 11 is a block diagram illustrating a process of adjusting, by an electronic device, a priority of an NTN cell, based on frequency information related to the NTN cell, so as to perform cell signal measurement and selection/reselection according to an embodiment of the disclosure.

In operation 1110, according to an embodiment, an electronic device (e.g., the electronic device 101 in FIG. 1) may receive system information or RRC signaling to identify frequency band or band information of neighbor cells. According to an embodiment, the frequency band or band information may include NTN-related information. According to an embodiment, the electronic device 101 may determine, based on predefined information, whether a frequency band or band received through system information or RRC signaling is an NTN band.

In operation 1120, according to an embodiment, the electronic device 101 may determine a frequency priority, based on received system information or RRC signaling. According to an embodiment, the electronic device 101 may lower the priority of a frequency band or a band determined as an NTN band. According to an embodiment, the electronic device 101 may raise the priority of a frequency band or a band defined as a wired backhaul cell or a wireless backhaul cell.

In operation 1130, according to an embodiment, the electronic device 101 may perform a cell signal measurement and camping operation according to the determined priority.

In operation 1140, according to an embodiment, when it is determined that a wired/wireless backhaul-based cell does not exist, or it is impossible to camp on a frequency band or a band of a wired/wireless backhaul-based cell, the electronic device 101 may perform a camping operation for a cell within an identified NTN band. According to an embodiment, when there are one or more frequency bands or bands in which an NTN cell exists, the electronic device 101 may determine a priority of measurement of each frequency, based on information received through system information or RRC signaling.

Referring to FIG. 11, the electronic device 101 may select or reselect a cell or a frequency according to the determined priority. That is, when there are a cell that is operable by an NTN and a cell that is not operated by an NTN, the electronic device 101 supporting an NTN may preferentially select or reselect an NTN cell. Alternatively, as another example, the electronic device 101 may preferentially select an NTN cell or preferentially select a normal cell according to whether a predetermined condition is satisfied. For example, when the electronic device 101 is currently operating in an NTN mode, the electronic device may preferentially select an NTN cell, and when the electronic device is operating in a non-NTN mode, the electronic device may preferentially select a normal cell. The operating in an NTN mode may imply at least one of a case where the electronic device 101 is currently receiving a predetermined service by using an NTN cell, a case where a user has configured the electronic device to preferentially use an NTN, a case where the electronic device is configured to preferentially use an NTN according to a subscription of a user, or a case where the electronic device has no non-NTN cell therearound, for which the quality of reception of a downlink reference signal, for example, an SS/PBCH, is equal to or greater than a predetermined criterion. The operating in an-non NTN mode may imply at least one of a case where a user has configured the electronic device to preferentially use a non-NTN cell, a case where the electronic device is configured to preferentially use a normal cell according to a subscription of a user, or a case where the electronic device has a normal cell therearound, for which the quality of reception of a downlink reference signal, for example, an SS/PBCH, is equal to or greater than a predetermined criterion.

The selecting or reselecting a cell may imply performing an operation of camping on the corresponding cell, and obtaining system information or RRC signaling to monitor a paging channel.

Figure 12:
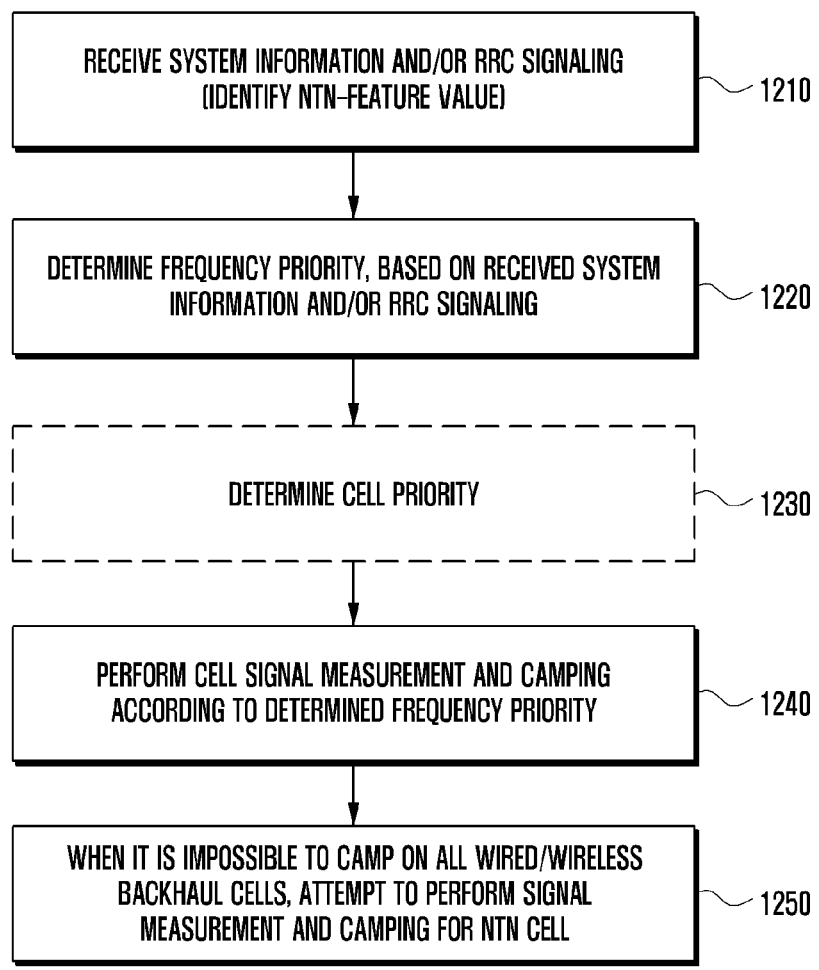
FIG. 12 is a flowchart illustrating an operation of adjusting, by an electronic device, priorities of NTN cells, based on system information, so as to perform cell selection/reselection according to an embodiment of the disclosure.

FIG. 12 is a flowchart illustrating an operation of adjusting, by an electronic device, priorities of NTN cells, based on system information or RRC signaling, so as to perform cell selection/reselection according to an embodiment of the disclosure.

In operation 1210, according to an embodiment, an electronic device (e.g., the electronic device 101 in FIG. 1) may receive system information or RRC signaling to identify information on neighbor cells. The information on neighbor cells may include NTN-related information related to cell signal measurement and selection/reselection. The NTN-related information may include an NTN-feature parameter.

In operation 1220, according to an embodiment, the electronic device 101 may determine a frequency priority, based on received system information or RRC signaling. According to an embodiment, the electronic device 101 may distinguish a frequency including at least one wired/wireless backhaul-based cell from a frequency including only an NTN cell. For example, the electronic device 101 may raise the priority of a frequency including at least one wired/wireless backhaul-based cell. For example, the electronic device 101 may lower the priority of a frequency including only an NTN cell.

In operation 1230, according to an embodiment, when the received system information or RRC signaling includes a frequency including both an NTN cell and a wired/wireless backhaul-based cell, the electronic device 101 may determine the priorities of the cells. According to an embodiment, operation 1240 may be optionally performed. According to an embodiment, the electronic device 101 may determine a high priority of a wired/wireless backhaul-based cell. For example, the electronic device 101 may determine a lower priority of an NTN cell compared to a wired/wireless backhaul-based cell.

In operation 1240, according to an embodiment, the electronic device 101 may perform a cell signal measurement and camping operation according to the determined priorities.

In operation 1250, according to an embodiment, when it is determined that it is impossible to camp on a wired/wireless backhaul-based cell, the electronic device 101 may perform a camping operation for an identified NTN band. In this case, when there are one or more frequency bands or bands in which an NTN cell exists, the electronic device may determine a priority of measurement of each frequency, based on information received through system information or RRC signaling.

Referring to FIG. 12, the electronic device 101 may select or reselect a cell or a frequency according to the determined priority. That is, when there are a cell that is operable by an NTN and a cell that is not operated by an NTN, the electronic device 101 supporting an NTN may preferentially select or reselect an NTN cell. Alternatively, as yet another example, the electronic device 101 may preferentially select an NTN cell or preferentially select a normal cell according to whether a predetermined condition is satisfied. For example, when the electronic device 101 is currently operating in an NTN mode, the electronic device may preferentially select an NTN cell, and when the electronic device is operating in a non-NTN mode, the electronic device may preferentially select a normal cell. The operating in an NTN mode may imply at least one of a case where the electronic device 101 is currently receiving a predetermined service by using an NTN cell, a case where a user has configured the electronic device to preferentially use an NTN cell, a case where the electronic device is configured to preferentially use an NTN cell according to a subscription of a user, or a case where the electronic device has no normal cell therearound, for which the quality of reception of a downlink reference signal, for example, an SS/PBCH, is equal to or greater than a predetermined criterion. The operating in an-non NTN mode may imply at least one of a case where a user has configured the electronic device to preferentially use a normal cell, a case where the electronic device is configured to preferentially use a normal cell according to a subscription of a user, or a case where the electronic device has a normal cell therearound, for which the quality of reception of a downlink reference signal, for example, an SS/PBCH, is equal to or greater than a predetermined criterion.

The electronic device 101 selecting or reselecting a cell may imply performing a camping operation on the corresponding cell and an operation of obtaining system information or RRC signaling to monitor a paging channel.

Figure 13:
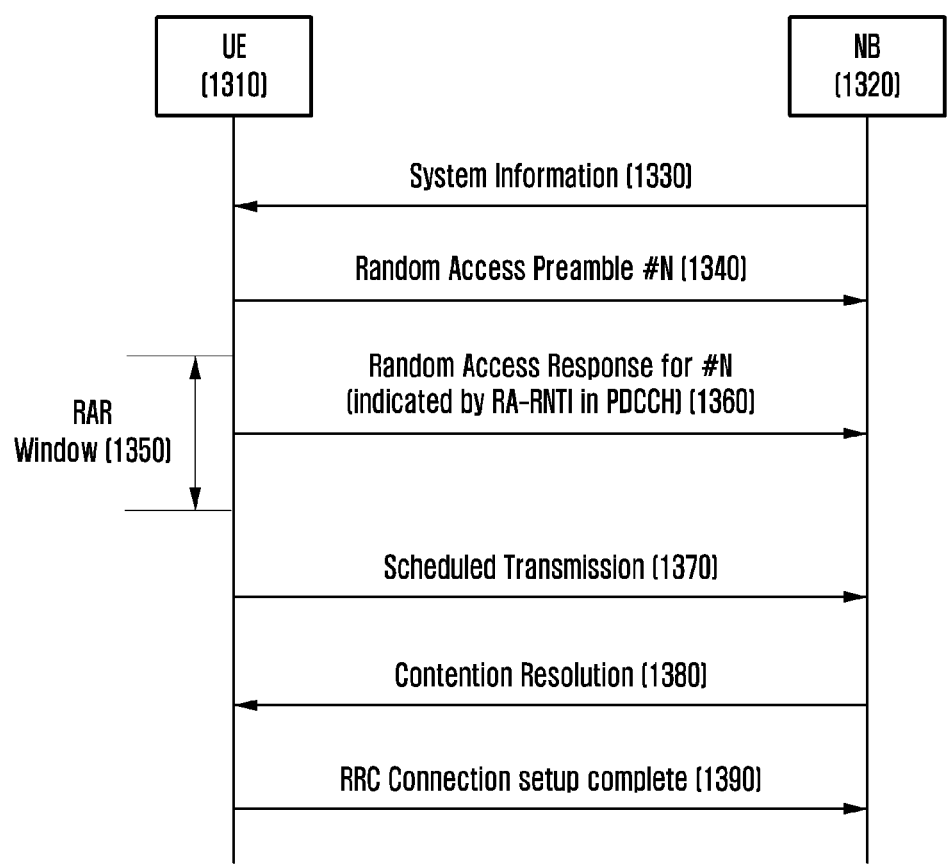
FIG. 13 is a diagram illustrating an operation of transitioning, by an electronic device, to an RRC connection mode, measuring a signal of a neighbor cell, and performing a camping operation according to an embodiment of the disclosure.

FIG. 13 is a diagram illustrating an operation of transitioning, by an electronic device, to an RRC connection mode, measuring a signal of a neighbor cell, and camps on the cell according to an embodiment of the disclosure.

Referring to FIG. 13, according to various embodiments of the disclosure, a cell reselection operation of an electronic device 1310 (e.g., the electronic device 101 in FIG. 1) may be a procedure of, when a service quality lowers due to a movement of the electronic device 1310, determining a cell on which the electronic device 1310 is to camp. The moving electronic device 1310 may be in an RRC idle mode (RRC idle, in the disclosure, may be represented by an RRC idle mode or a sleeping mode). For reference, a handover may be a technique by which an electronic device manages mobility of the electronic device in an RRC connection mode, and cell reselection may be a technique by which an electronic device manages mobility of the electronic device in an RRC idle mode. While determination of a handover is performed by a network (MME or source eNB), cell reselection may be determined by an electronic device. According to various embodiments, a condition to perform a handover may be determined by a network (MME or source eNB) and transferred to an electronic device, and a determination on whether to perform an actual handover may be determined by the electronic device. Cell reselection may be determined by an electronic device. The electronic device 1310 may measure a signal of a cell, and reselect a cell on which the electronic device is to camp, based on a measured value. According to various embodiments, the electronic device 1310 may measure a signal of a cell, and perform a handover to a cell on which the electronic device is to camp, based on a measured value. A cell reselected by the electronic device 1310 while the electronic device is moving may be one of a cell (intra-frequency cell) using an LTE frequency identical to that of a serving cell on which the electronic device is currently camping, a cell (inter-frequency cell) using a different LTE frequency, or a cell (inter-RAT cell) using a different wireless access technology.

In operation 1330, the electronic device 1310 may receive a system information block (SIB) broadcast by a base station of a serving cell. The electronic device 1310 in an RRC idle mode may perform a series of operations while camping on a serving cell of a base station 1320. For reference, an MIB, an SIB1, and an SIB2 may include system information commonly applied to all electronic devices, and an SIB3-SIB8 may include information required by the electronic device 101 in an RRC idle mode to reselect a cell. According to various embodiments, when a neighbor cell uses a carrier frequency identical to that of a serving cell (infra-frequency), information related to measurement of a signal of the neighbor cell may be transferred to an SIB4. In this case, the carrier frequencies of a serving cell and a neighbor cell are the same, and thus information on a carrier frequency may not be included in system information. According to various embodiments of the disclosure, when a neighbor cell uses a carrier frequency different from that of a serving cell (inter-frequency), information related to measurement of a signal of the neighbor cell may be transferred to an SIB5. In this case, the carrier frequencies of a serving cell and a neighbor cell are different from each other, and thus information on a carrier frequency may be included in system information. According to various embodiments of the disclosure, system information may further include a threshold value used for determination on whether to measure a signal of a neighbor cell, and a parameter used for calculation of the ranks of a serving cell and neighbor cells.

The electronic device 1310 in an RRC idle mode (RRC_IDLE) may also receive system information from the base station 1320 on which the electronic device camps. According to various embodiments of the disclosure, the electronic device 1310 may receive an SIB1 including system information from the base station 1320, and a PLMN list may be included in the SIB1. The PLMN list may, for example, be included in a CellAccessRelatedInfo parameter. The electronic device 1310 may identify whether a corresponding cell is a home public land mobile network (HPLMN), through the received SIB1. In addition, the SIB1 includes information on a serving cell configuration (e.g., servingCellConfigCommonSIB), and thus the electronic device 1310 may identify uplink/downlink basic configuration information of a serving cell. The SIB1 may further include information on a PRACH resource, and the electronic device 1310 may identify time and frequency resources on which a random access preamble is to be transmitted, according to the information. Table 10 is an example for RACH information included in the SIB1. According to an embodiment, RACH information below may be included in a ServingCellConifigCommon parameter and then transmitted.

TABLE 10

ASN1START
TAG-RACH-CONFIGGENERIC-START
RACH-ConfigGeneric ::=     SEQUENCE {
prach-ConfigurationIndex     INTEGER (0..255),
msg1-FDM          ENUMERATED {one, two, four, eight},
msg1-FrequencyStart     INTEGER (0..maxNrofPhysicalResourceBlocks−1),
zeroCorrelationZoneConfig     INTEGER(0..15),
preambleReceivedTargetPower     INTEGER (−202..−60),
preambleTransMax     ENUMERATED {n3, n4, n5, n6, n7, n8, n10, n20, n50, n100, n200},
powerRampingStep     ENUMERATED {dB0, dB2, dB4, dB6},
ra-ResponseWindow     ENUMERATED {sl1, sl2, sl4, sl8, sl10, sl20, sl40, sl80},
...
}
TAG-RACH-CONFIGGENERIC-STOP
ASN1STOP The electronic device 1310 in an RRC idle mode may, for example, access the base station when data to be transmitted occurs. The electronic device 1310 in an RRC idle mode is not connected to a network in order to save power, and thus may be impossible to transmit data, and thus a mode change to an RRC connection mode (RRC_CONNECTED) may be needed for data transmission.

The wording "camping on" described above may mean that the electronic device 1310 stays in a corresponding cell, and is receiving a paging message so as to determine whether data comes through a downlink. The electronic device 1310 performing an access procedure for the base station may imply the electronic device performing a random access procedure for the corresponding base station and/or cell.

In operation 1340, in order to access the base station 1320, the electronic device 1310 may select a PRACH preamble, based on information received through an SIB1 described above, and transmit a random access preamble by using the corresponding PRACH. A case where one or more electronic devices simultaneously transmit random access preambles by using a PRACH resource may occur. The PRACH resource may be positioned over one or more subframes. Alternatively, only some symbols in one subframe may be used as the PRACH resource. In addition, the random access preamble may have multiple preamble indexes according to a particular sequence specially designed such that the preamble is able to be received even when being transmitted before complete synchronization with the base station. When there are multiple preamble indexes, a preamble transmitted by the electronic device may be randomly selected by the electronic device, or may be a particular preamble designated by the base station.

A RAR message is required to be transmitted within a predetermined period after a predetermined time from transmission of a preamble, and this period may be called "a RAR window" as indicated at operation 1350". The RAR window may have a RAR window starting time point which is a time point after a predetermined time from transmission of the first preamble. The predetermined time may be a subframe unit (e.g., 1 ms) or a value smaller than the same. According to various embodiments, the predetermined time may be transmitted by the base station through system information. According to various embodiments, the electronic device may determine the predetermined time according to a predetermined method. In addition, the length of the RAR window may be a predetermined value configured by the base station for each PRACH resource or each of one or more PRACH resource sets in a message broadcast by the base station. The electronic device 1310 may monitor a random access response message (msg 2) therefor for the period of the RAR window, in operation 1350. The electronic device 1310 monitoring a random access response message (msg 2) may include continuously identifying a physical layer control signal (PDCCH) corresponding to a RAR for the RAR window of operation 1350 to identify whether a PDCCH signal is transmitted on a PDCCH from the base station 1320, based on a pre-promised RNTI (RA-RNTI).

When a RAR message is transmitted, the electronic device 1310 may schedule the RAR message by using a PDCCH, and scheduling information may be scrambled by using a random access-radio network temporary identifier (RA-RNTI). The RA-RNTI may be mapped with a PRACH resource used for preamble transmission, and the electronic device 1310 having transmitted a preamble on a particular PRACH resource may attempt to perform PDCCH reception, based on the corresponding RA-RNTI so as to determine whether there is a corresponding RAR message. When a RAR message is a response to a preamble transmitted by the electronic device 1310 in operation 1350 as illustrated in FIG. 13, an RA-RNTI used for scheduling information of the RAR message may be included in information transmitted in operation 1330. To this end, the RA-RNTI may be calculated by Equation 1 below.

$$\text{RA-RNTI} = 1 + s\_id + 14 \times t\_id + 14 \times 80 \times f\_id + 14 \times 80 \times 8 \times \text{ul\_carrier\_id} \qquad \text{Equation 1}$$

$s\_id$ is an index corresponding to the first OFDM symbol at which transmission of a preamble transmitted in operation 1330 is started, and may have a value of $0 \leq s\_id < 14$ (i.e., the maximum number of OFDMs in one slot). In addition, $t\_id$ is an index corresponding to the first slot at which transmission of a preamble transmitted in operation 1330 is started, and may have a value of $0 \leq t\_id < 80$ (i.e., the maximum number of slots in one system frame (10 ms)). In addition, $f\_id$ indicates what ordinal number of a PRACH resource on which a preamble transmitted in operation 1330 is transmitted on frequency, and may have a value of $0 \leq f\_id < 8$ (i.e., the maximum number of PRACHs on frequency in the same time). ul_carrier_id may be a factor for, when two uplink subcarriers are used for one cell, distinguishing whether a preamble has been transmitted in a normal uplink (NUL) (in this case, 0) or a preamble has been transmitted in a supplementary uplink (SUL) (in this case, 1).

In operation 1360, when the base station 1320 receives a preamble, the base station may transfer a random access response message (RAR, msg2) for the corresponding preamble to the electronic device 1310. The RAR message may include, in addition to preamble index information used in operation 1330, uplink transmission timing correction information, and uplink resource allocation information and temporary terminal identifier information to be used in operation 1360 later. The preamble index information may be transmitted, for example, to inform of a preamble for which the RAR message is a response message when multiple electronic devices attempts to perform random accesses by transmitting different preambles in operation 1340. The uplink resource allocation information may be detailed information of a resource to be used by the terminal in operation 1370, and a physical position and size of the resource, a decoding (modulation) and coding scheme (MCS) used at the time of transmission, and information on power control at the time of transmission. The temporary electronic device identifier information may be a value transmitted to be used because the electronic device does not have an identifier assigned by a base station to communicate with the base station when the terminal having transmitted a preamble performs an initially access.

In operation 1370, the electronic device 1310 may include the ID of the electronic device and a connection reason in an RRC connection request message (msg3) requesting an RRC connection, and transmit same to the base station 1320. As an example of msg3 transmitted by the electronic device 1310, in a case of an initial access, the message may be an RRCRequest message that is a message in an RRC layer, in a case of a re-access, the message may be an RRCReestablishmentRequest message, and in a case of a handover, the message may be an RRCReconfigurationComplete message. Alternatively, a buffer status report (BSR) message for a resource request may be msg 3 transmitted by the electronic device 1310. According to an embodiment, in a case of initial transmission (i.e., msg3 does not include base station identifier information pre-assigned to the electronic device), the electronic device 1310 may receive a contention resolution message from the base station (operation 1380). The contention resolution message may include the contents transmitted through msg3 by the electronic device 1310 without change, and even when multiple electronic devices have selected the same preamble in operation 1340, the message may report which electronic device a response is intended for.

In operation 1380, the base station 1320 may transfer a response message (msg4) for a corresponding RRC connection request to the electronic device 1310. When an RRC connection setup message is received in operation 1370, the electronic device 1310 may determine that a permission for an RRC connection mode is received from the base station 1320, and transfer an RRC connection setup complete message to the base station 1320, in operation 1390. The mode of the electronic device 1310 is changed to an RRC connection mode (RRC_CONNECTED), and the electronic device 1310 being in the RRC connection mode can transmit or receive data with the base station 1320.

Figure 14:
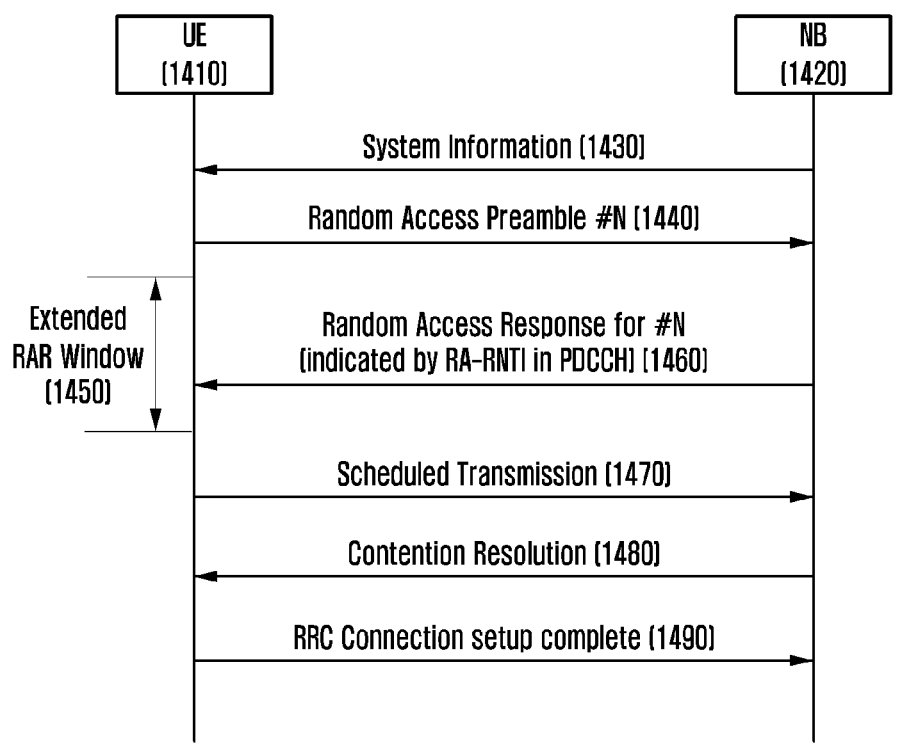
FIG. 14 is a signal flowchart illustrating a RACH operation performed between an electronic device and a base station in an NR-U system according to an embodiment of the disclosure.

FIG. 14 is a signal flowchart illustrating a RACH operation performed between an electronic device and a base station in an NR-U system according to an embodiment of the disclosure.

Referring to FIG. 14, according to an embodiment, at least some electronic devices (e.g., the electronic device 101 in FIG. 1) operating in an NR-U system may perform listen before talk (LBT). An RAR window of an electronic device performing LBT may require a value larger than a RAR window for a normal NR cell. Therefore, a parameter such as ra-ResponseWindowExt may be added to a parameter associated with a RACH operation described above. Table 11 shows an example of an ra-ResponseWindowExt parameter.

TABLE 11

...
ra-ResponseWindowExt  ENUMERATED {sl160, sl320, sl640, sl1280 }
...

According to an embodiment, the electronic device 1410 may perform a RAR monitoring operation for the determined extended RAR window of operation 1450.

Operations 1440, 1450, 1460, 1470, 1480, and 1490 below are the same as described in operations 1340, 1350, 1360, 1380, and 1390 of FIG. 13, and thus a description therefor can be omitted here.

An electronic device (e.g., the electronic device 101 in FIG. 1) accessing an NTN cell may perform a RACH operation identical to a RACH operation of an electronic device accessing an NR-U system described with reference to FIG. 14. According to an embodiment, a RAR window of at least some electronic devices operating in an NTN cell may be required to be larger than a RAR window for a normal cell. Therefore, a parameter such as ra-ResponseWindowExt may be added to a parameter associated with a RACH operation described above. Table 12 shows an example of an ra-ResponseWindowExt parameter.

TABLE 12

...
ra-ResponseWindowExt  ENUMERATED {sl160, sl320, sl640, sl1280,... }
...

In operation 1430, according to an embodiment, an electronic device 1410 (e.g., the electronic device 101 in FIG. 1) may receive system information including an ra-ResponseWindowExt parameter. When only an ra-ResponseWindowExt parameter is included in the system information, the electronic device 1410 may determine the size of an extend RAR window of operation 1450 to be a value indicated by the ra-ResponseWindowExt parameter. According to another embodiment, when the received system information includes an ra-ResponseWindowExt parameter together with the ra-ResponseWindow parameter, the electronic device 1410 (or the electronic device 1410 not supporting NR-U) which is to access a normal cell may determine the size of the extended RAR window of operation 1450, based on a value indicated by the ra-ResponseWindow parameter. According to another embodiment, when the received system information includes an ra-ResponseWindowExt parameter together with the ra-ResponseWindow parameter, the electronic device 1410 which is to access an NR-U cell may determine the size of the extended RAR window of operation 1450, based on a value indicated by the ra-ResponseWindowExt parameter. According to another embodiment, when the received system information includes an ra-ResponseWindowExt parameter together with the ra-ResponseWindow parameter, the electronic device 1410 may determine the size of the extended RAR window of operation 1450, based on the sum of a value indicated by the ra-ResponseWindow parameter and a value indicated by the ra-ResponseWindowExt parameter.

According to an embodiment, an NR-U cell may include an ra-ResponseWindow parameter in system information and then transmit same. According to another embodiment, the NR-U cell may include an ra-ResponseWindow parameter and an ra-ResponseWindowExt parameter in system information and then transmit same. According to various embodiments, the NR-U cell may include an ra-ResponseWindow parameter in system information and then transmit same, and may optionally include an ra-ResponseWindowExt parameter in the system information and then transmit same.

As in operation 1430, according to an embodiment, an electronic device 1510 (or the electronic device 1510 operating in an NTN mode) accessing an NTN cell may receive system information including an ra-ResponseWindowExt parameter accessing from a base station 1420. When only an ra-ResponseWindowExt parameter is included in the received system information, the electronic device 101 may determine the size of the extended RAR window of operation 1450 to be a value indicated by the ra-ResponseWindowExt parameter. According to another embodiment, when an ra-ResponseWindowExt parameter is received together with the ra-ResponseWindow parameter, the electronic device 101 operating in an NTN mode may determine the size of the extended RAR window of operation 1450, based on a value indicated by the ra-ResponseWindowExt parameter. According to another embodiment, when an ra-ResponseWindowExt parameter is received together with the ra-ResponseWindow parameter, the electronic device 1510 operating in a non-NTN mode may determine the size of the extended RAR window of operation 1450, based on a value indicated by the ra-ResponseWindow parameter. According to various embodiments, when an ra-ResponseWindowExt parameter is received together with the ra-ResponseWindow parameter, the electronic device 101 operating in an NTN mode may determine the size of the extended RAR window of operation 1450, based on the sum of a value indicated by the ra-ResponseWindow parameter and a value indicated by the ra-ResponseWindowExt parameter.

According to an embodiment, an NTN cell may include an ra-ResponseWindow parameter in system information and then transmit same. According to another embodiment, the NTN cell may include an ra-ResponseWindow parameter and an ra-ResponseWindowExt parameter in system information and then transmit same. According to various embodiments, the NTN cell may include an ra-ResponseWindow parameter in system information and then transmit same, and may optionally include an ra-ResponseWindowExt parameter in the system information and then transmit same.

According to an embodiment, the electronic device 101 may perform a RAR monitoring operation for the determined RAR window of operation 1450.

The other operations are the same as described with reference to FIG. 13, and thus a description thereof can be omitted here.

Figure 15:
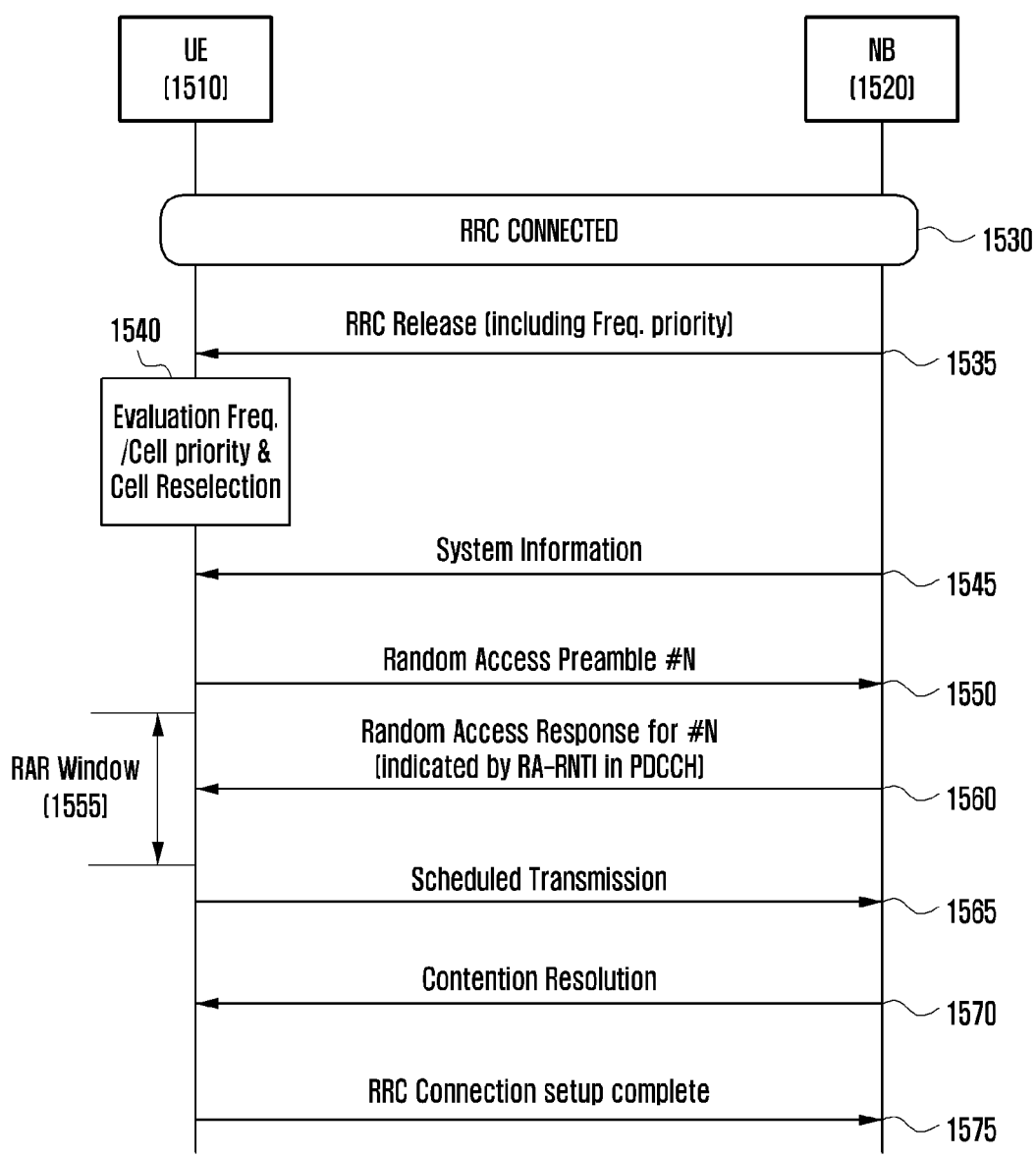
FIG. 15 is a diagram illustrating an operation of reselecting, by an electronic device, a cell, based on information received from an RRC connection release message, and reconnecting to the selected cell according to an embodiment of the disclosure.

FIG. 15 is a diagram illustrating an operation of reselecting, by an electronic device, a cell, based on information received from an RRC release message, and reconnecting to the selected cell according to an embodiment of the disclosure.

In operation 1530, the electronic device 1510 may be in a state of RRC connection to a base station 1520 of a serving cell. When the electronic device 1510 is in a state of RRC connection to the base station 1520, the electronic device may operate in an RRC connection mode.

In operation 1535, the electronic device 1510 may receive an RRC connection release message. According to various embodiments of the disclosure, the RRC connection release message may include frequency priority information.

In operation 1540, the electronic device 1510 may determine the priority of a frequency by using the frequency priority information included in the received RRC connection release message. The electronic device 1510 may measure a signal of a cell according to the determined frequency priority, and reselect the cell.

In operation 1545, the electronic device 1510 may receive system information of the base station. According to various embodiments of the disclosure, the system information of the base station may be received by using an SIB. The SIB may be broadcast by the base station.

In operation 1550, the electronic device 1510 may transmit a random access preamble by using the received system information. According to various embodiments of the disclosure, the electronic device 1510 may select a preamble by using the received SIB, and transmit same so as to access a base station of the reselected cell.

In operation 1555, the electronic device 1510 may determine the size of a RAR window by using the received system information. According to various embodiments, the size of the RAR window determined in operation 1555 may be determined according to a scheme of determining the extended RAR window of operation 1450 described with reference to FIG. 14.

In operation 1560, the base station 1520 may transmit, to the electronic device 1510, a random access response message as a response to the random access preamble.

In operation 1565, the electronic device 1510 may include the ID of the electronic device and a connection reason in an RRC connection request message, and transmit same to the base station 1520.

In operation 1570, the base station 1520 may transmit a response message for the RRC connection request to the electronic device 1510.

In operation 1575, the electronic device 1510 may transmit an RRC connection setup complete message to the base station 1520.

Referring to FIG. 15, operations 1545, 1550, 1555, 1560, 1565, 1570, and 1575 are similar to operation 1340, 1350, 1360, 1370, 1380, and 1390 of FIG. 13, and thus a description therefor can be omitted here.

Figure 16:
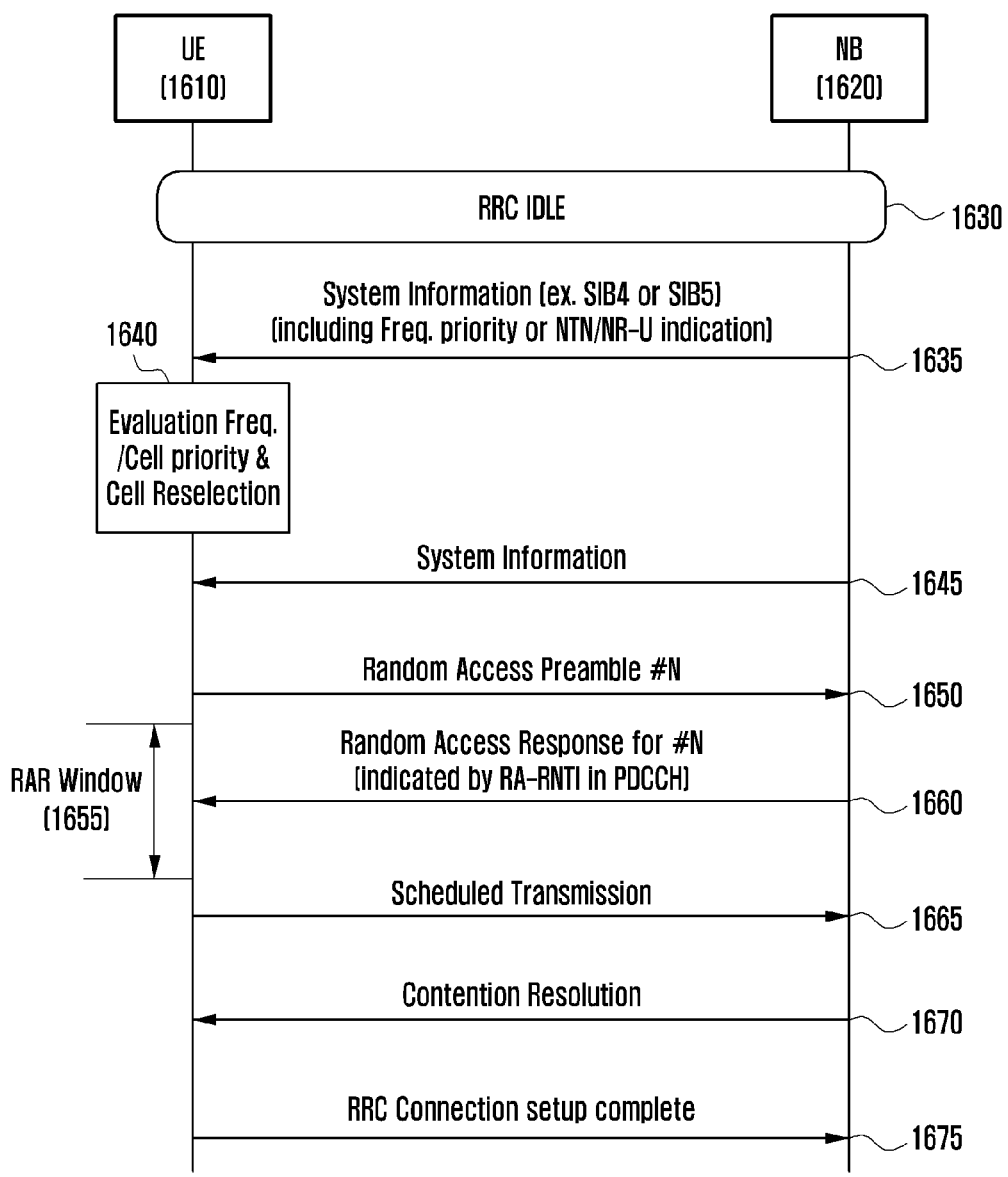
FIG. 16 is a diagram illustrating an operation of reselecting, by an electronic device, a cell, based on system information received in an RRC idle mode, and reconnecting to the selected cell according to an embodiment of the disclosure.

FIG. 16 is a diagram illustrating an operation of reselecting, by an electronic device, a cell, based on system information received in an RRC idle mode, and reconnecting to the selected cell according to an embodiment of the disclosure.

In operation 1630, an electronic device 1610 may be in an RRC idle mode. The electronic device 1610 may be switched to be in an RRC idle mode, for example, when communication is not performed for a predetermined period.

In operation 1635, the electronic device 1610 may receive system information. According to various embodiments of the disclosure, the system information may include at least one of frequency priority information, an NTN indicator, and an NR-U indicator. The system information may be included in an SIB4 or SIB5 and transmitted.

In operation 1640, the electronic device 1610 may determine the priority of a frequency by using the received system information, measure a signal of a cell according to the determined priority of the frequency, and reselect the cell.

In operation 1645, the electronic device 1610 may receive system information of a base station.

In operation 1650, the electronic device 1610 may transmit a random access preamble by using the received system information.

In operation 1655, the electronic device 1610 may determine the size of a RAR window by using the received system information. According to various embodiments, the size of the RAR window determined in operation 1655 may be determined according to a scheme of determining the extended RAR window of operation 1450 described with reference to FIG. 14.

In operation 1660, a base station 1620 may transmit, to the electronic device 1610, a random access response message as a response to the random access preamble.

In operation 1665, the electronic device 1610 may include the ID of the electronic device and a connection reason in an RRC connection request message, and transmit same to the base station 1620.

In operation 1670, the base station 1620 may transmit a response message for the RRC connection request to the electronic device 1610.

In operation 1675, the electronic device 1610 may transmit an RRC connection setup complete message to the base station 1620.

Operations 1645, 1650, 1655, 1660, 1665, 1670, and 1675 of FIG. 16 are similar to operation 1340, 1350, 1360, 1370, 1380, and 1390 of FIG. 13, and thus a description therefor can be omitted here.

Figure 17:
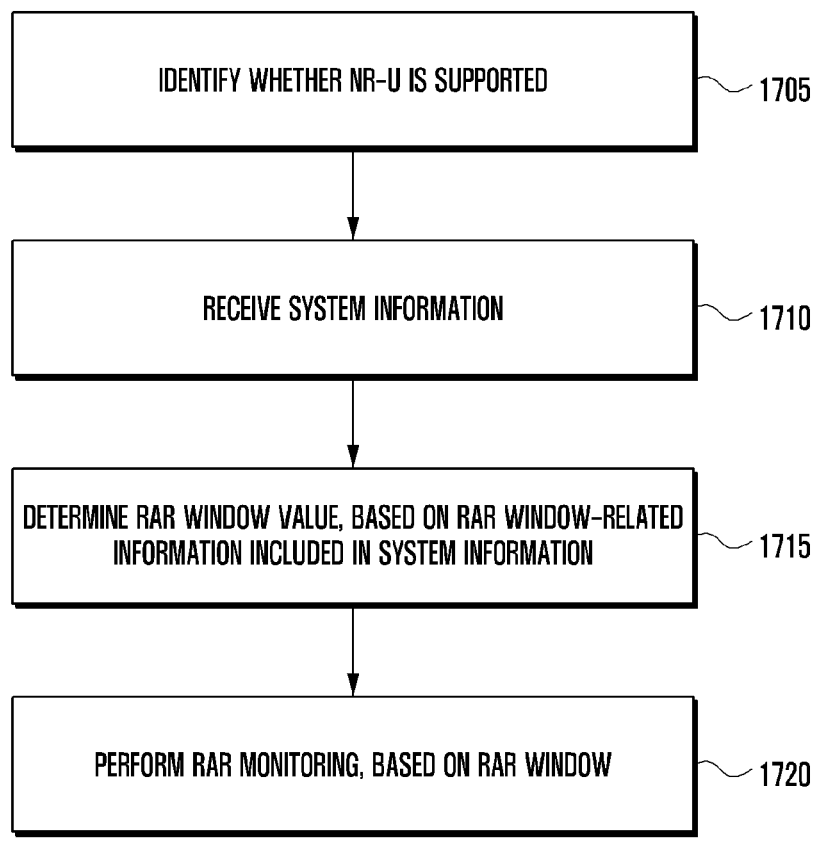
FIG. 17 is a flowchart illustrating a RACH operation of an electronic device in an NR-U system according to an embodiment of the disclosure.

FIG. 17 is a flowchart illustrating a RACH operation of an electronic device in an NR-U system according to an embodiment of the disclosure.

In operation 1705, an electronic device (e.g., the electronic device 101 in FIG. 1) may identify whether the electronic device 101 supports NR-U. According to an embodiment, the electronic device 101 supporting NR-U may not adjust the priority of an NR-U cell in a cell selection/reselection operation. According to an embodiment, the electronic device 101 supporting NR-U may perform an operation of raising or lowering the priority of an NR-U cell in a cell selection/reselection operation. A detailed description therefor has been given above, and thus can be omitted here.

In operation 1710, the electronic device 101 may receive system information from a base station. According to an embodiment, the system information may include a parameter associated with a RACH operation. According to an embodiment, the system information may include a parameter associated with a RAR window described above.

Referring to FIG. 17, according to an embodiment, the system information may include information on a neighbor cell and a serving cell. The information on a neighbor cell and/or a serving cell may include information on an NR-U cell.

In operation 1715, the electronic device 101 may determine the size of a RAR window by using the parameter associated with the RAR window included in the system information. According to various embodiments, the size of the RAR window determined in operation 1715 may be determined according to a scheme of determining the extended RAR window of operation 1450 described with reference to FIG. 14.

In operation 1720, the electronic device 101 may perform RAR monitoring according to the determined size of the RAR window. The electronic device 101 may transmit a RACH preamble to the base station, based on the parameter associated with the RACH operation included in the system information, and then perform a RAR monitoring operation according to the determined size of the RAR window.

Figure 18:
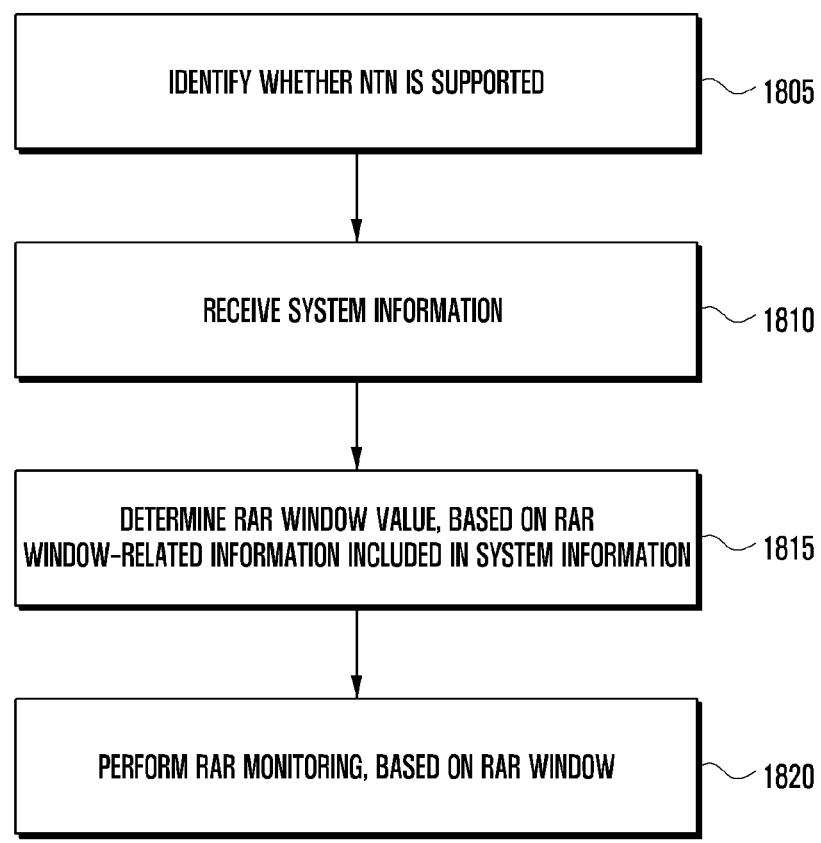
FIG. 18 is a flowchart illustrating a RACH operation of an electronic device in an NTN system according to an embodiment of the disclosure.

FIG. 18 is a flowchart illustrating an RACH operation of an electronic device in an NTN system according to an embodiment of the disclosure.

In operation 1805, an electronic device (e.g., the electronic device 101 in FIG. 1) may identify whether the electronic device 101 supports NTN.

Referring to FIG. 18, according to an embodiment, the electronic device 101 supporting an NTN may not adjust the priority of an NTN cell in a cell selection/reselection operation. According to an embodiment, the electronic device 101 supporting NTN may perform an operation of raising or lowering the priority of an NTN cell in a cell selection/reselection operation. A detailed description therefor has been given above, and thus can be omitted here.

In operation 1810, the electronic device 101 may receive system information from a base station. According to an embodiment, the system information may include a parameter associated with a RACH operation. According to an embodiment, the system information may include a parameter associated with a RAR window described above. According to an embodiment, the system information may include information on a neighbor cell and a serving cell. The information on a neighbor cell and/or a serving cell may include information on an NTN cell.

In operation 1815, the electronic device 101 may determine the size of a RAR window by using the parameter associated with the RAR window included in the system information. According to various embodiments, the size of the RAR window determined in operation 1815 may be determined according to a scheme of determining the extended RAR window of operation 1450 described with reference to FIG. 14.

In operation 1820, the electronic device 101 may perform RAR monitoring according to the determined size of the RAR window. The electronic device 101 may transmit a RACH to the base station, based on the parameter associated with the RACH operation included in the system information, and then perform RAR monitoring according to the determined size of the RAR window. According to an embodiment, the parameter associated with the RACH operation included in the system information may include at least one piece of information required for generation of a RACH preamble. According to an embodiment, the parameter associated with the RACH operation included in the system information may include at least one piece of information on a time frequency resource for transmission of a RACH preamble, or a combination thereof. According to an embodiment, in a RACH operation for an NTN cell, the electronic device 101 may be possible to transmit a RACH preamble having the same preamble ID on at least one time frequency resource at several times. According to an embodiment, in a RACH operation for an NTN cell, the electronic device 101 can transmit a RACH preamble having the at least one different preamble ID on at least one time frequency resource at several times.

According to various embodiments, when two or more RACH preambles are transmitted by the electronic device 101, the electronic device 101 may perform a procedure of identifying a physical downlink control channel (PDCCH) for a RAR, based on two or more random access-radio network temporary identifiers (RA-RNTIs).

Figure 19:
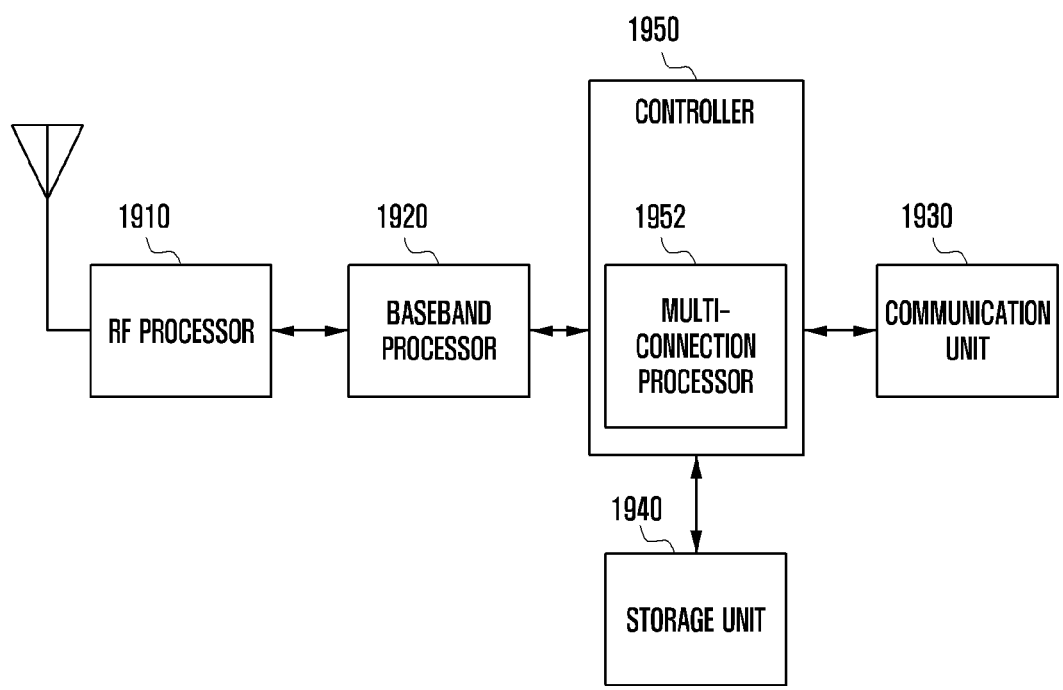
FIG. 19 is a diagram illustrating a structure of a base station according to an embodiment of the disclosure.

FIG. 19 is a diagram illustrating a structure of a base station according to an embodiment of the disclosure.

A base station according to an embodiment of the disclosure may include one or more transmission reception points (TRPs).

The base station according to an embodiment of the disclosure may be configured by including an RF processor 1910, a baseband processor 1920, a communication unit 1930, a storage unit 1940, and a controller 1950.

The RF processor 1910 may perform a function, such as signal band change, amplification, etc., for transmitting or receiving a signal through a wireless channel. That is, the RF processor 1910 may upconvert a baseband signal provided from the baseband processor 1920, into an RF band signal, and then transmit the RF band signal through an antenna, and downconvert an RF band signal received through the antenna, into a baseband signal. For example, the RF processor 1910 may include a transmission filter, a reception filter, an amplifier, a mixer, an oscillator, a digital-to-analog converter (DAC), an analog-to-digital converter (ADC), and the like.

Referring to FIG. 19, only one antenna is illustrated, but the base station may include a plurality of antennas. In addition, the RF processor 1910 may include a plurality of RF chains. Moreover, the RF processor 1910 may perform beamforming. To perform beamforming, the RF processor 1910 may adjust the phase and size of each of signals transmitted or received through a plurality of antennas or antenna elements. The RF processor may perform a downlink multi-input and multi-output (MIMO) operation by transmitting at least one layer.

The baseband processor 1920 may perform a function of conversion between a baseband signal and a bit stream according to a physical layer protocol of a first wireless access technology. For example, when data is transmitted, the baseband processor 1920 may generate complex symbols by encoding and modulating a transmission bit stream. In addition, when data is received, the baseband processor 1920 may reconstruct a reception bit stream by demodulating and decoding a baseband signal provided from the RF processor 1910. For example, in a case where an OFDM scheme is applied, when data is transmitted, the baseband processor 1920 may generate complex symbols by encoding and modulating a transmission bit stream, map the complex symbols to subcarriers, and then configure OFDM symbols through inverse fast Fourier transform (IFFT) calculation and CP insertion. In addition, when data is received, the baseband processor 1920 may divide a baseband signal provided from the RF processor 1910, by the units of OFDM symbols, reconstruct signals mapped to subcarriers, through FFT calculation, and then reconstruct a reception bit stream through demodulation and decoding. The baseband processor 1920 and the RF processor 1910 may transmit and receive a signal as described above. Accordingly, the baseband processor 1920 and the RF processor 1910 may be called a transmitter, a receiver, a transceiver, a communication unit, or a wireless communication unit.

The communication unit 1930 may provide an interface for performing communication with other nodes within a network.

The storage unit 1940 may store data such as a basic program, an application program, and configuration information for an operation of the main base station. Particularly, the storage unit 1940 may store information relating to a bearer assigned to a connected terminal, a measurement result reported from a connected terminal, etc. In addition, the storage unit 1940 may store information serving as a determination criterion of whether to provide or stop providing multi-connection to a terminal. The storage unit 1940 may provide stored data in response to a request of the controller 1950.

The controller 1950 may control overall operations of the main base station. For example, the controller 1950 may transmit or receives a signal through the baseband processor 1920 and the RF processor 1910, or through the communication unit 1930. In addition, the controller 1950 may record and read data in and from the storage unit 1940. To this end, the controller 1950 may include at least one processor (e.g., multi-connection processor 1952). Accordingly, the storage unit 1940 and the RF processor 1910 may be called a transmitter, a receiver, a transceiver, a communication unit, or a wireless communication unit.

Figure 20:
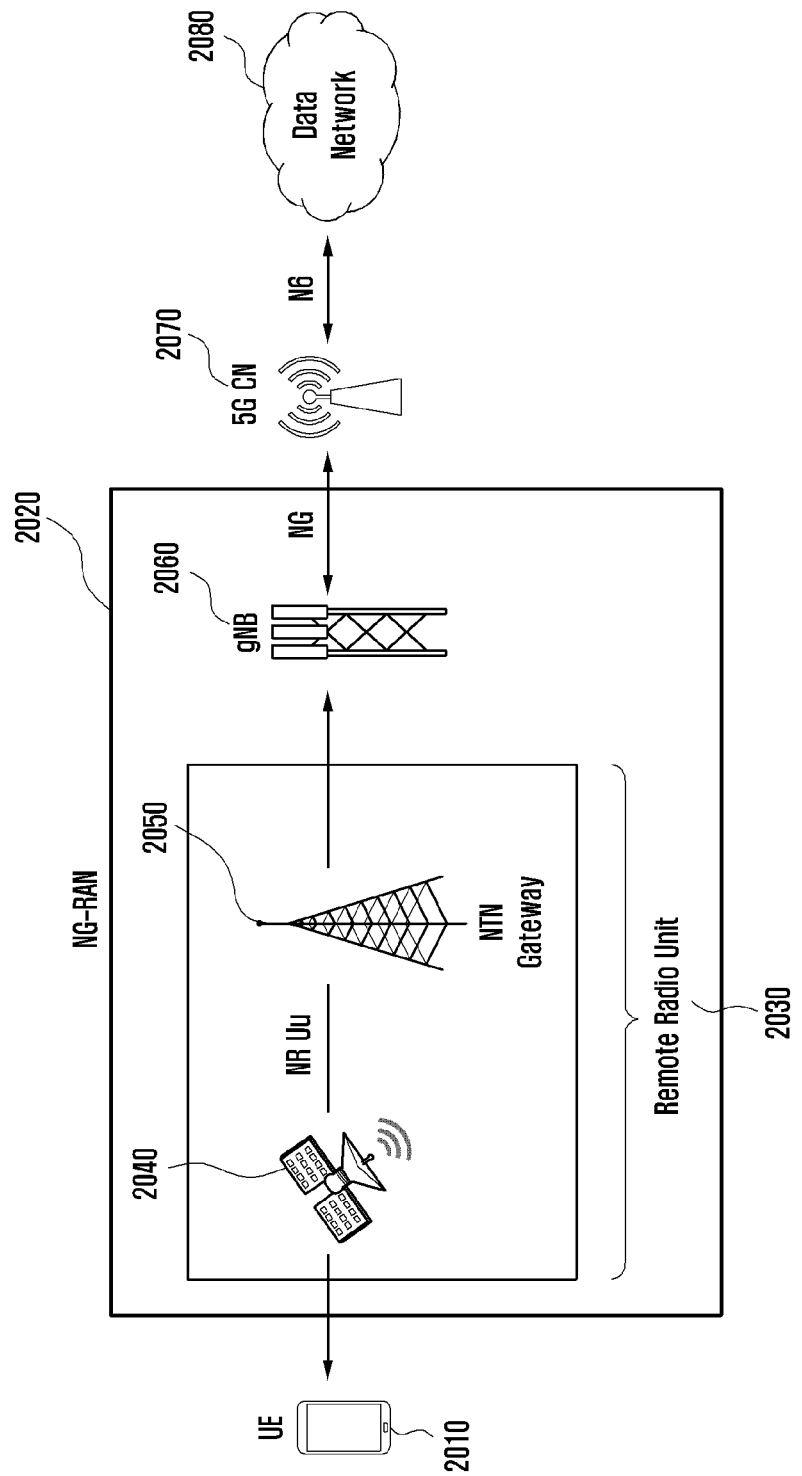
FIG. 20 is a diagram illustrating a structure of an NTN system according to an embodiment of the disclosure.

FIG. 20 is a diagram illustrating a structure of an NTN system according to an embodiment of the disclosure.

Referring to FIG. 20, an NTN system may be a system for preparation for communication interruption which may occur in an area of disruption of a terrestrial network due to various disasters such as earthquake, tsunami, and war, and in a cellular shadow area, such as a mountainous area, a desert area, an insular area, and a sea.

The NTN system may be configured by an NG-RAN 2020, a 5G CN 2070, and a data network 2080. The NG-RAN 2020 may be configured by a remote radio unit 2030 and a gNB 2060, and the remote radio unit 2030 may be configured by a satellite 2040 and an NTN gateway 2050.

When an electronic device 2010 is connected to the NTN system, the electronic device may transmit or receive data to or from the satellite 2040, and the satellite 2040 may transmit or receive data to or from the NTN gateway 2050. The NTN gateway 2050 may be connected to the gNB 2060, and the gNB 2060 may be connected to a data network via the 5G CN 2070.

An electronic device according to the disclosure may include an antenna, a communication module connected to the antenna, and a processor connected to the communication module, wherein the processor is configured to identify a frequency band that the electronic device is able to support, receive system information including information on a neighbor cell from a base station, determine, based on at least one of the identified frequency band and the received system information, whether the neighbor cell is one of an unlicensed cell or a non-terrestrial cell, determine a priority of a frequency as a cell selection criterion, based on at least one of the identified frequency band and the received system information or a type of the determined cell, and select a cell according to the determined priority of the frequency.

In the electronic device according to the disclosure, the system information received from the base station may include information on a cell of the base station and information on a neighbor cell.

The processor of the electronic device according to the disclosure may be configured to lower a priority of the unlicensed frequency band or the non-terrestrial frequency band.

The processor of the electronic device according to the disclosure may be configured to, when one of the unlicensed cell or the non-terrestrial cell is selected, receive system information including information related to a random access response (RAR) window from the selected cell, and perform RAR monitoring in consideration of the received RAR window information.

The processor of the electronic device according to the disclosure may be configured to perform a determination according to a priority of a frequency included in the system information received from the base station.

The processor of the electronic device according to the disclosure may be configured to determine the priority of the frequency by using frequency-related information stored in the electronic device.

Information on the frequency band of the electronic device according to the disclosure may be transmitted from the base station.

A method for selecting a cell by an electronic device according to the disclosure may include identifying a frequency band that the electronic device is able to support, receiving system information including information on a neighbor cell from a base station, determining, based on at least one of the identified frequency band and the received system information, whether the neighbor cell is one of an unlicensed cell or a non-terrestrial cell, determining a priority of a frequency as a cell selection criterion, based on at least one of the identified frequency band and the received system information or a type of the determined cell, and selecting a cell according to the determined priority of the frequency.

In the method for selecting the cell by the electronic device according to the disclosure, the system information received from the base station may include information on a cell of the base station and information on a neighbor cell.

In the method for selecting the cell by the electronic device according to the disclosure, the determining of the priority of the frequency may correspond to lowering a priority of the unlicensed frequency band or the non-terrestrial frequency band.

The method for selecting the cell by the electronic device according to the disclosure may further include: when one of the unlicensed cell or the non-terrestrial cell is selected, receiving system information including information related to a random access response (RAR) window from the selected cell; and performing RAR monitoring in consideration of the received RAR window information.

In the method for selecting the cell by the electronic device according to the disclosure, the determining of the priority of the frequency may correspond to performing a determination according to a priority of a frequency included in the system information received from the base station.

In the method for selecting the cell by the electronic device according to the disclosure, the determining of the priority of the frequency may correspond to determining the priority of the frequency by using frequency-related information stored in the electronic device.

In the method for selecting the cell by the electronic device according to the disclosure, information on the frequency band of the electronic device according to the disclosure may be transmitted from the base station.

A base station device according to the disclosure may include an antenna, a communication module connected to the antenna, and a processor connected to the communication module, wherein the processor is configured to transmit information on a cell supported by the base station device, and information on a neighbor cell, and perform a random access operation with an electronic device, wherein the information on the cell includes information on a frequency band that the cell is able to support, and wherein the information on the frequency band that the cell is able to support includes at least one of an unlicensed frequency band and a non-terrestrial frequency band.

In the base station device according to the disclosure, the information on the cell may further include a priority of a frequency as a criterion of cell selection by the electronic device.

In the base station device according to the disclosure, the information on the cell may further include information related to a random access response (RAR) window.

An operation method of a base station device according to the disclosure may include transmitting information on a cell supported by the base station device, and information on a neighbor cell, and performing a random access with an electronic device, wherein the information on the cell includes information on a frequency band that the cell is able to support, and wherein the information on the frequency band that the cell is able to support includes at least one of an unlicensed frequency band and a non-terrestrial frequency band.

In the operation method of the base station according to the disclosure, the information on the cell may further include a priority of a frequency as a criterion of cell selection by the electronic device.

In the operation method of the base station device according to the disclosure, the information on the cell may further include information related to a random access response (RAR) window.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an antenna;
a communication module connected to the antenna; and
a processor connected to the communication module,
wherein the processor is configured to:
identify a frequency band the electronic device supports,
receive, from a base station, system information including information on a neighbor cell and cell type information indicating at least one of an unlicensed cell, a non-terrestrial cell and a public land mobile network (PLMN) type associated with the neighbor cell,
determine a cell type of the neighbor cell based on the received cell type,
search for a highest-ranked cell on a carrier frequency based on predefined criteria, including at least one of signal strength, quality of service (QoS) and network preference,
determine whether the highest-ranked cell belongs to a selected PLMN or a PLMN indicated as equivalent to a registered PLMN of the electronic device,
prohibit selection of the highest-ranked cell as a suitable cell for a predetermined time period when determining that the highest-ranked cell does not belong to the selected PLMN or the PLMN indicated as equivalent to the registered PLMN,
lower a priority of a frequency when the neighbor cell is determined as one of the unlicensed cells or the non-terrestrial cells based on the cell type information,
determine the priority of the frequency based on at least one of the frequency band or the system information,
select a cell based on the determined priority of the frequency,
receive system information including information related to a random access response (RAR) window from the selected cell, when the selected cell is the unlicensed cell, and
perform RAR monitoring during an extended RAR window when the selected cell is the unlicensed cell, wherein a duration of the extended RAR window exceeds that of a licensed cell by a predefined margin or is determined based on system configuration parameters.

2. The electronic device of claim 1, wherein the processor is further configured to determine whether to select the neighbor cell based on the determined priority of the frequency and a signal quality of the neighbor cell.

3. The electronic device of claim 1, wherein the processor is further configured to determine the priority of the frequency by using frequency-related information stored in the electronic device.

4. The electronic device of claim 1, wherein the processor is further configured to receive, from the base station, information on the frequency band.

5. A method for selecting a cell by an electronic device, the method comprising:
identifying a frequency band the electronic device supports;
receiving, from a base station, system information including information on a neighbor cell and cell type information indicating at least one of an unlicensed cell, a non-terrestrial cell and a public land mobile network (PLMN) type associated with the neighbor cell;
determining a cell type of the neighbor cell based on the received cell type,
searching for a highest-ranked cell on a carrier frequency based on predefined criteria, including at least one of signal strength, quality of service (QOS) and network preference,
determining whether the highest-ranked cell belongs to a selected PLMN or a PLMN indicated as equivalent to a registered PLMN of the electronic device,
prohibiting selection of the highest-ranked cell as a suitable cell for a predetermined time period when determining that the highest-ranked cell does not belong to the selected PLMN or the PLMN indicated as equivalent to the registered PLMN,
lowering a priority of a frequency when the neighbor cell is determined as one of the unlicensed cell or the non-terrestrial cell based on the cell type information,
determining the priority of the frequency based on at least one of the frequency band or the system information,
selecting a cell based on the determined priority of the frequency,
receiving system information including information related to a random access response (RAR) window from the selected cell, when the selected cell is the unlicensed cell, and
performing RAR monitoring during an extended RAR window when the selected cell is the unlicensed cell, wherein a duration of the extended RAR window exceeds that of a licensed cell by a predefined margin or is determined based on system configuration parameters.

6. The method of claim 5, wherein the determining of the priority of the frequency comprises determining whether to select the neighbor cell based on the determined priority of the frequency and a signal quality of the neighbor cell.

7. The method of claim 5, wherein the determining of the priority of the frequency comprises determining the priority of the frequency by using frequency-related information stored in the electronic device.

8. The method of claim 5, further comprising receiving, from the base station, information on the frequency band.

* * * * *